(12) United States Patent
Rostagni et al.

(10) Patent No.: US 10,896,201 B2
(45) Date of Patent: Jan. 19, 2021

(54) SYNCHRONIZATION OF BLOCK BASED VOLUMES

(71) Applicant: INTERNATIONAL BUSINESS MACHINES CORPORATION, Armonk, NY (US)

(72) Inventors: Florent Rostagni, Southampton (GB); John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 15/983,136

(22) Filed: May 18, 2018

(65) Prior Publication Data

US 2019/0354627 A1    Nov. 21, 2019

(51) Int. Cl.
*G06F 16/27* (2019.01)
(52) U.S. Cl.
CPC ............ *G06F 16/273* (2019.01); *G06F 16/27* (2019.01)
(58) Field of Classification Search
CPC .......... G06F 16/273; G06F 16/27; G06F 3/65; G06F 11/2053; G06F 11/2064; G06F 11/2082
USPC ........................................................ 707/613
See application file for complete search history.

(56) References Cited

U.S. PATENT DOCUMENTS 6,823,336 B1 * 11/2004 Srinivasan ............ G06F 3/0611
6,829,355 B2 * 12/2004 Lilly ..................... H04L 9/0643
380/255
6,993,635 B1 * 1/2006 Gazit ................... G06F 11/2082
711/114
7,647,462 B2    1/2010 Wolfgang et al.
7,856,422 B2   12/2010 Linkert et al.
7,979,654 B2    7/2011 Stager et al.
8,954,673 B1    2/2015 Natanzon et al.
9,152,339 B1 * 10/2015 Cohen ................. G06F 11/2066
9,418,131 B1    8/2016 Halevi et al.
2005/0198454 A1 * 9/2005 Yoder ................. G06F 12/0866
711/162

(Continued)

OTHER PUBLICATIONS

"How Rsync Works a Practical Overview" Samba.org. Published before Jul. 18, 2006. Accessed Mar. 10, 2020 from <https://web.archive.org/web/20060718172927/https://rsync.samba.org/how-rsync-works.html> (Year: 2006).*

(Continued)

*Primary Examiner* — Robert W Beausoliel, Jr.
*Assistant Examiner* — Arthur Ganger
(74) *Attorney, Agent, or Firm* — Kristofer L. Haggerty

(57) ABSTRACT

Embodiments of the present invention disclose a method, a computer program product, and a computer system for data synchronization. A first data storage device reads a first data region and generates a first hash of the first data region before transmitting the first hash to a second data storage device. The second data storage device reads a second data region corresponding to the first data region and generates a second hash of the second data region. The second data storage device then determines whether the first hash matches the second hash and, based on determining that the first hash does not match the second hash, transmits data of the second data region to the first data storage device. The first data storage device applies the data of the second data region, thereby synchronizing the first data storage device and the second data storage device.

14 Claims, 33 Drawing Sheets

(56) References Cited

U.S. PATENT DOCUMENTS

| | | | | |
|---|---|---|---|---|
| 2009/0271779 | A1* | 10/2009 | Clark | G06F 8/71 |
| | | | | 717/171 |
| 2016/0004718 | A1* | 1/2016 | Lin | G06F 16/1774 |
| | | | | 707/690 |
| 2017/0003883 | A1 | 1/2017 | Hatfield et al. | |
| 2017/0070589 | A1* | 3/2017 | Mineo | H04L 67/2842 |
| 2017/0091044 | A1 | 3/2017 | Beeken et al. | |

OTHER PUBLICATIONS

"ChunkStash: Speeding up Inline Storage Deduplication using Flash Memory" Debnath et al. Jun. 2010. Accessed Mar. 9, 2020 from <https://www.microsoft.com/en-us/research/publication/chunkstash-speeding-up-inline-storage-deduplication-using-flash-memory/> (Year: 2010).*

Henson, "An Analysis of Compare-by-hash," Proceedings of HotOS IX: the 9th Workshop on Hot Topics in Operating Systems—vol. 9, HOTOS '03, Lihue, Hawaii, May 18-21, 2003, Copyright USENIX Association Berkeley, CA, 2003, pp. 1-3.

Pending U.S. Appl. No. 15/460,684, filed Mar. 16, 2017, entitled: "Comparison of Block Based Volumes with Ongoing Inputs and Outputs", 63 pages.

Pending U.S. Appl. No. 15/822,250, filed Nov. 27, 2017, entitled: "Comparison of Block Based Volumes with Ongoing Inputs and Outputs", 62 pages.

Pending U.S. Appl. No. 15/877,405, filed Jan. 23, 2018, entitled: "Handling Node Failure in Multi-Node Data Storage Systems ", 51 pages.

Pending U.S. Appl. No. 15/598,362, filed May 18, 2017, entitled: "Collision Detection at Multi-Node Storage Sites", 50 pages.

Pending U.S. Appl. No. 15/888,307, filed Feb. 5, 2018, entitled: "Collision Detection at Multi-Node Storage Sites", 40 pages.

Mell et al., "The NIST Definition of Cloud Computing", National Institute of Standards and Technology, Special Publication 800-145, Sep. 2011, pp. 1-7.

* cited by examiner

SYNCHRONIZATION OF BLOCK BASED VOLUMES

BACKGROUND

The present invention relates generally to redundant data storage, and more particularly to synchronizing data backups.

SUMMARY

Embodiments of the present invention disclose a method, a computer program product, and a computer system for data synchronization. According to one embodiment, a method for data synchronization in a distributed database system is disclosed, the distributed database system comprising a first data storage device having a first set of data regions and a second data storage device having a second set of data regions corresponding to the first set of data regions. In embodiments, the method comprises processing, by the first data storage device, a first data region of the first set of data regions by reading the first data region and generating a first hash of the first data region. In addition, the method comprises transmitting, by the first data storage device to the second data storage device, the first hash and receiving, by the second data storage device, the first hash. Moreover, the method comprises processing, by the second data storage device, a second data region of the second set of data regions corresponding to the first data region by reading the second data region and generating a second hash of the second data region.

In embodiments, the method also comprises determining, by the second data storage device, whether the first hash matches the second hash and, based on determining that the first hash does not match the second hash, transmitting data of the second data region to the first data storage device. According to embodiments, the method further comprises applying, by the first data storage device, the data of the second data region, thereby synchronizing the first data storage device and the second data storage device. Moreover, and based on determining that the first hash matches the second hash, the method further comprises the second data storage device transmitting a message to the first data storage device indicating that the first data region and the second data region contain a same data.

The method may further comprise receiving, by the first data storage device, a host write during the processing of the first data region. In some embodiments, the method further comprises delaying, by the first data storage device, the processing of the first data region and applying, by the first data storage device, the host write. Additionally, the described embodiment of the method comprises receiving, by the first data storage device from the second data storage device, a message indicating that the second data storage device has applied the host write and restarting, by the first data storage device, the processing of the first data region. In other embodiments, the method comprises applying, by the first data storage device, the host write and merging the host write with the read data of the first data region before hashing the merged first data region and host write.

In some embodiments, the method may further comprise receiving, by the first data storage device, a host write during the processing of the second data region and transmitting the host write to the second data storage device. In some embodiments, the method may then comprise cancelling, by the second data storage device, the processing of the second data region, applying the host write, and, based on determining that the host write modifies an entirety of the second data region, transmitting to the first data storage device a message indicating that the host write has been applied to the second data storage device. Alternatively, and based on determining that the host write modifies a portion of the second data region, the method may further comprise transmitting, by the second data storage device to the first data storage device, a message indicating that the host write has been applied to the second data storage device and to restart the processing of the first data region. In other embodiments, the method may further comprise delaying, by the second data storage device, application of the host write and processing the second data region. Moreover, the described embodiment may further comprise applying, by the second data storage device, the host write and, based on determining that the first hash matches the second hash, transmitting to the first data storage device a message indicating that the host write has been applied and that the first data region and the second data region contain a same data. Alternatively, based on determining that the first hash does not match the second hash, the method may further comprise transmitting, by the second data storage device to the first data storage device, a message indicating that the host write has been applied along with data of the second data region that does not overlap with data of the host write.

In some embodiments, the method may additionally comprise receiving, by the second data storage device, a host write prior to receiving the first hash and transmitting, by the second data storage device to the first data storage device, the host write. Moreover, the method may include receiving, by the second data storage device from the first data storage device, the first hash and applying the host write. In addition, the method may comprise receiving, by the second data storage device from the first data storage device, a message indicating that the first data storage device has applied the host write. The method may then comprise discarding, by the second data storage device, the processing of the second data region and transmitting to the first data storage device a message to restart the processing of the first data region. Alternatively, the method may include transmitting, by the second data storage device to the first data storage device, a message to restart the processing of the first data region for data of the first data region that does not overlap with data of the host write. In a further embodiment, the method may include delaying, by the second data storage device, the processing of the second data region and receiving from the first data storage device a message indicating that the first data storage device has applied the host write. This further embodiment may also include processing, by the second data storage device, the second data region and transmitting to the first data storage device data of the second data region that does not overlap with data of the host write. In a yet further embodiment, the method may comprise processing, by the second data storage device, the second data region and transmitting to the first data storage device the second hash.

The method may further comprise receiving, by the second data storage device, a host write during the processing of the of the second data region. In some embodiments, the method may include discarding, by the second data storage device, the processing of the second data region and applying the host write before transmitting to the first data storage device the host write and a message to restart the processing of the first data region. In an alternative embodiment, the method may comprise delaying, by the second data storage device, application of the host write and processing the second data region before applying the host write. In this alternative embodiment, and based on determining that the first hash matches the second hash, the method may comprise transmitting, by the second data storage device to the first data storage device, the host write and a message indicating that the first data region and the second data region contain a same data. Alternatively, based on determining that the first hash does not match the second hash, the described embodiment of the method further comprises transmitting, by the second data storage device to the first data storage device, the host write and data of the second data region. In a further embodiment, the method may comprise applying, by the second data storage device, the host write and processing the second data region including the host write before transmitting to the first data storage device the second hash of the second data region including the host write.

According to some embodiments, the method further comprises receiving, by the first data storage device, a host write while applying the received data of the second data region and delaying application of the host write. Moreover, in this embodiment, the method may further comprise applying, by the first data storage device, the received data of the second data region to the first data storage device and then applying the host write. In embodiments, transmissions between the first data storage device and the second data storage device are received in-order.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
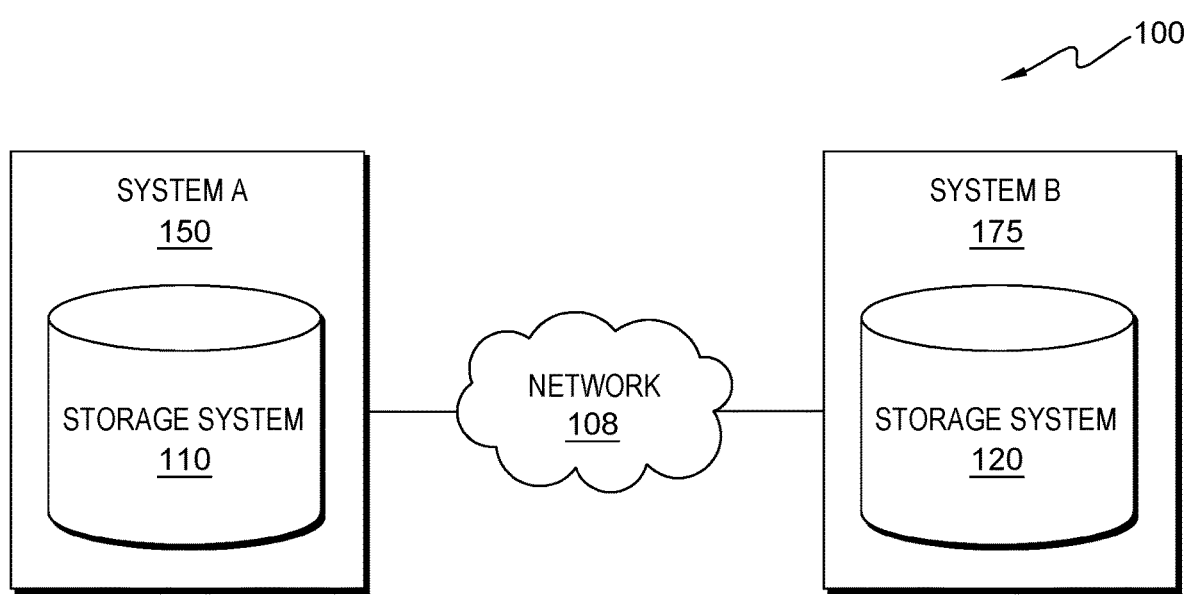
FIG. 1 depicts a schematic diagram of data synchronization system 100, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements of various embodiments of the present invention.

In storage systems, it is common to have two volumes containing the same data. In general, one copy is the production volume where data are written while the second copy is a copy of the first volume that can be used as a back-up copy in, for example, disaster recovery, archiving, point-in-time copying, testing while ensuring the production copy is not corrupted, etc. When using the back-up copy in disaster recovery, it is crucial that both copies remain synchronized all the times. For active-active high availability, which is the scope of this invention, both volumes are considered the production volumes, as host I/Os can be submitted to either copy. Active-active technologies ensure that both copies remain identical all the time while hosts I/Os are being processed. However, in the event of a failure of one copy, host I/Os being applied to the remaining copy will make the copies different. When the other copy returns from failure, it contains out-of-date data and needs to be resynchronized with the up-to-date copy.

The question is thus how to resynchronize the two copies. Common solutions are based on the I/O quiescing, or pausing: host I/Os to the two copies are stopped and copies are resynchronized in the meantime with a synchronization process. Typical synchronization process consists in using bitmaps recording the regions that have been written to since the last time both copies were identical. When a synchronization is made, these solutions assume that except for the dirty bits, both copies contain the same data. The synchronization process then consists in comparing only the data of the dirty bits and to synchronize the ones that are different. The comparison is made by reading both copies and by sending the data from one copy to the other, where it will be compared and potentially written.

These solutions present several drawbacks. The first one is that they assume that the data is the same for clean grains and this is not necessarily true. For instance, the bitmap does not know if an error occurred on one copy, meaning that errors that corrupted this copy data are not reported in the bitmap. Thus, when comparing the data on both copies based on the dirty bits of the bitmap, these errors may remain unnoticed within the clean grains. Moreover, in case of active-active copies (when both copies receive host writes that are to be replicated to the other copy), it means that each copy has to keep track of its dirty grains, and thus the bitmap uses twice the memory space than in the case of active-passive copies.

A second drawback of these solutions is that they compare grains in their entirety. This means that grains are read on both copies and compared bit-by-bit. This is not necessarily a major issue, at least not when both copies are located in the same system where the data may be sent from one node to another. But when both copies are in different locations, for example hundreds of kilometres from one another, data has to be sent from one system to another one, using the bandwidth between the two sites. Thus, when comparing entire volumes on both sites, bandwidth use can be critical as it will require sending potential terabytes of data just to compare them. Moreover, sending terabytes of data will take a certain amount of time during which no host I/Os can be performed.

An additional consideration to those listed above is that a key parameter of these solutions is the size of the regions represented by the grains. On one hand, using a thin granularity allows to keep track of very small changes but at the cost of an increased use of memory for the bitmap itself. On the other hand, using a large size means using less memory but a small change will be enough to dirty a whole larger region. The problem here comes from the very fact of using a bitmap in order to avoid sending all the data for comparison.

Importantly, and as previously mentioned, in order to synchronize a given grain, the system must quiesce all host I/Os to this particular grain. This is problematic for three reasons:

First, it means that data of a grain cannot be accessed while the grain is being compared. Thus, host I/Os have to either: (1) be queued, meaning there must be spare resources to store these host I/Os before the grain is accessible again (this increases the latency for these I/Os as well as for I/Os affecting this grain while the queued I/Os are still being processed); or (2) be discarded, enabling a cheap way to solve the problems of the previous approach while of course being very problematic for hosts that cannot access their storage during the comparison process. This means that production on the volume must be interrupted, which may not be envisaged.

Second, it means that there is a need for a complex mechanism to quiesce host I/Os to the grains that are being compared. This mechanism is likely to use resources and thus to reduce the system's overall performances.

Third and finally, these solutions require the selection of a master copy of the data: the master copy is the copy that will be replicated to the other copy at the end of the synchronization process. In the scenario of a single failure, this is not a problem: after a copy that was lost is accessible again, it makes sense to copy the data from the live copy to the now accessible copy. However, things can become more complex in multiple failure scenarios. For example, if copy A goes offline and comes back, copy B will send its data to A to compare and potentially write it. If, before the end of the resynchronization, copy B goes offline, then copy A will become the production copy. So when copy B comes back online, it needs to be resynchronized. This means that the bitmaps of dirty grains must be merged before starting the resynchronization process, thereby increasing the complexity of the resynchronization mechanism as the number of failures is increased.

In the present invention, described in greater detail herewith, we propose a new tool to resynchronize data on both copies. This tool is advantageous in that (1) it does not require the system to quiesce host I/Os; and (2) it compares all the data not through use of a bitmap recording dirty bits but rather by sending a smaller representation of the real data. This enables a much quicker comparison/synchronization, particularly in the case of multiple failure scenarios.

This solution solves the above problem of synchronizing data between two different volumes located in different systems, even when these systems are far away from one another and are in active-active relationships. Instead of sending data from one copy to the other, it consists in using a hash algorithm to hash the data, then in sending only the hashes to compare with the hashes of the data of the other copy. It is only when hashes differ that data will be sent from the system making the comparison to the other system. This solution allows synchronization of large volumes of data while only using small amount of bandwidth: hashes are generally hundreds or thousands of times smaller than their corresponding data (here, we recommend 400 times smaller) and only data of regions with mismatching hashes is sent. Furthermore, using a system of priority, this solution provides a background synchronization tool with no impact on host I/Os.

The invention herein discloses a novel system capable of providing: a synchronization solution for systems in an active-active relationship; a synchronization solution for systems with ongoing I/Os; a synchronizing solution for systems in active-active relationship with ongoing I/Os that utilizes a hash-based comparison; and a synchronization solution for resolving collisions between host I/Os in an active-active relationship.

Terminology

In the following, grain and data chunk refer to the same unity of data. In the example embodiment, they correspond to a contiguous region of 8 kB, however in other embodiments, the size of a grain/data chunk may vary.

Splitting the Data

In this invention, data is read and split into data chunks. The aim of the data chunks is to use a global and coherent unit to compute the hashes throughout the entire volume, and to keep track of the progress of the synchronization. The size of the data chunks and the size of the hashes will thus define the compression ratio of data compared to data transmitted. The data chunks can be any size, and any secure hashing algorithm can be used, as data security is not the point of this invention. The size of the hash is often set by the choice of the hashing algorithm, and therefore may vary by application. In the example embodiment, the invention utilizes the SHA-1 algorithm, which produces hashes of 20 B. Moreover, in the example embodiment, the invention utilizes data chunks of 8 kB, which corresponds to an effective compression ratio of 400:1. A data chunk refers to a contiguous region of storage within a volume, but has no further physical or logical impact on the volume: in particular, hosts may continue to address reads and writes to the volume at any offset or size that the underlying storage supports.

In terms of data chunk size, using a small data chunk enables the tracking of differences in small regions at the cost of increasing the number of chunks. However, as capturing differences is the concern here, it is important to use a fine granularity, and in one embodiment of the present invention, 8 kB is a good compromise. It will be clear to those with expertise in storage systems that host applications and host operating systems have a natural granularity of writes that they typically use, for example 4 kB or 32 kB, and thus improved effectiveness of this invention may be achieved by selecting a chunk size that best matches the writes most likely to be seen. Thus, in other embodiments, the appropriate data chunk size may vary by host applications, host operating systems, and the like.

FIG. 1 depicts a schematic diagram of data synchronization system 100, in accordance with an embodiment of the present invention. In the example embodiment, data synchronization system 100 includes System A 150 ("System A") and System B 175 ("System B"), all interconnected via network 108.

In the example embodiment, network 108 is a communication channel capable of transferring data between connected devices. In the example embodiment, network 108 may be the Internet, representing a worldwide collection of networks and gateways to support communications between devices connected to the Internet. Moreover, network 108 may include, for example, wired, wireless, or fiber optic connections which may be implemented as an intranet network, a local area network (LAN), a wide area network (WAN), or a combination thereof. In further embodiments, network 108 may be a Bluetooth network, a WiFi network, or a combination thereof. In yet further embodiments, network 108 may be a telecommunications network used to facilitate telephone calls between two or more parties comprising a landline network, a wireless network, a closed network, a satellite network, or a combination thereof. In general, network 108 can be any combination of connections and protocols that will support communications between computing devices of System A and System B.

In the example embodiment, System A comprises storage system 110, which contains volumes of data. In the example embodiment, storage system 110 processes input and output, e.g. reads and writes, to the volumes of data stored at System A. Similarly, System B comprises storage system 120, which contains volumes of data, and storage system 120 process input and output, i.e. reads and writes, to the volumes of data stored at System B. In the example embodiment, System A and System B can communicate with each other via network 108 such that data stored on storage system 110 is replicated to storage system 120 and vice versa using active-active or active-passive data replication technologies.

In the following, we assume two different systems, i.e. System A and System B, with block storage systems, i.e. storage system 110 and storage system 120. Each system has a volume copy and these two copies are identical thanks to an active-active replication technology. Both systems communicate with each other via network 108, using internet bandwidth for example. We also assume the messaging between both systems is ordered, meaning that message i sent from System A to System B before message j will be treated by System B before message j, even if message j reaches System B before message i. Such ordering is trivial to implement in software, even if the underlying technology does not provide such a guarantee, and so this assumption holds for all types of data synchronization system 100. This invention also assumes the existence of a reliable and fast hash technology to compute hashes of the data stored on the back-end storage, such as that found in most recent server CPUs.

General Process

Figure 2:
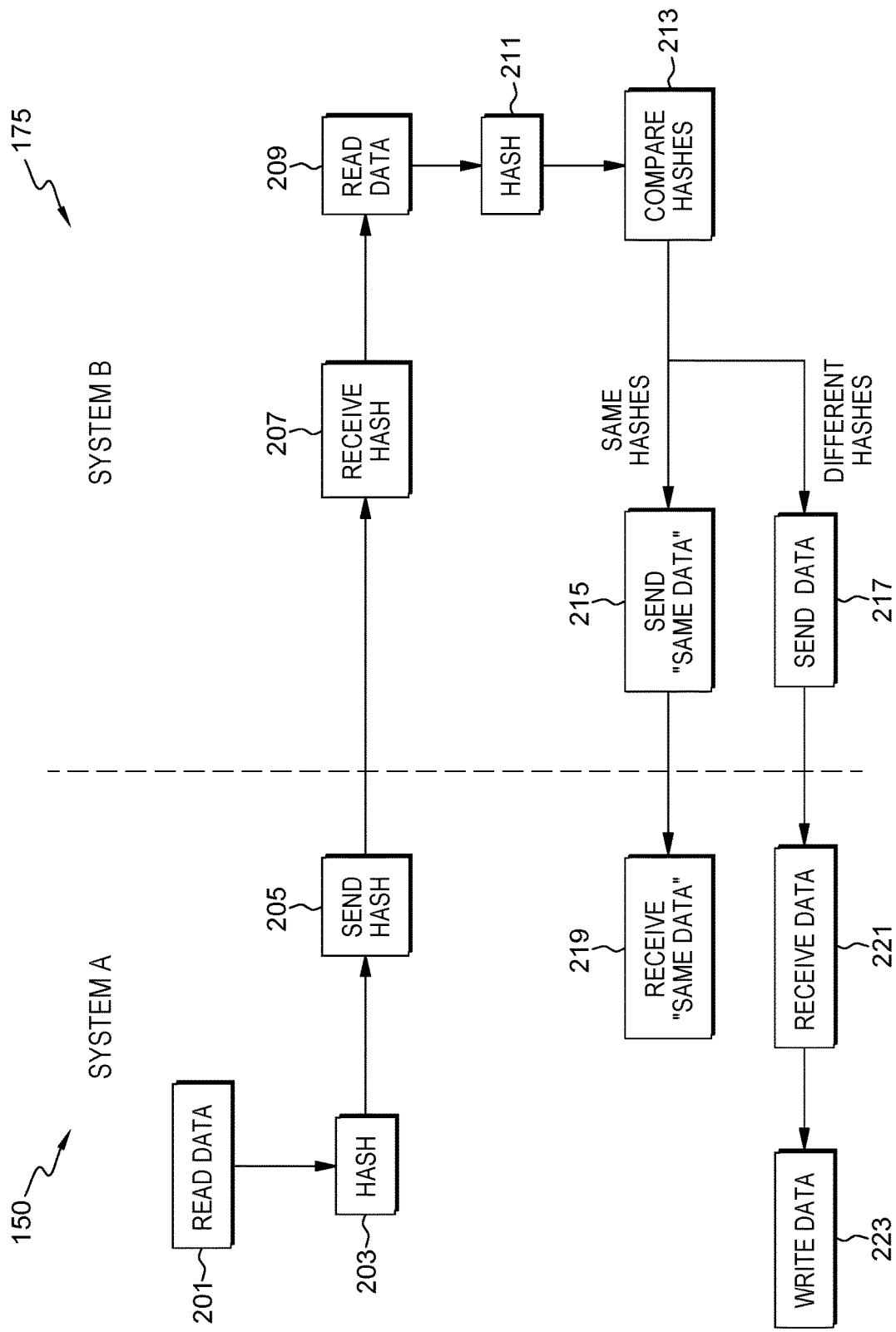
FIG. 2 depicts a flowchart illustrating a general process overview of hash-based data synchronization, in accordance with an embodiment of the present invention.

FIG. 2 depicts a flowchart illustrating a general process overview of hash-based data synchronization, in accordance with an embodiment of the present invention.

Figure 3:
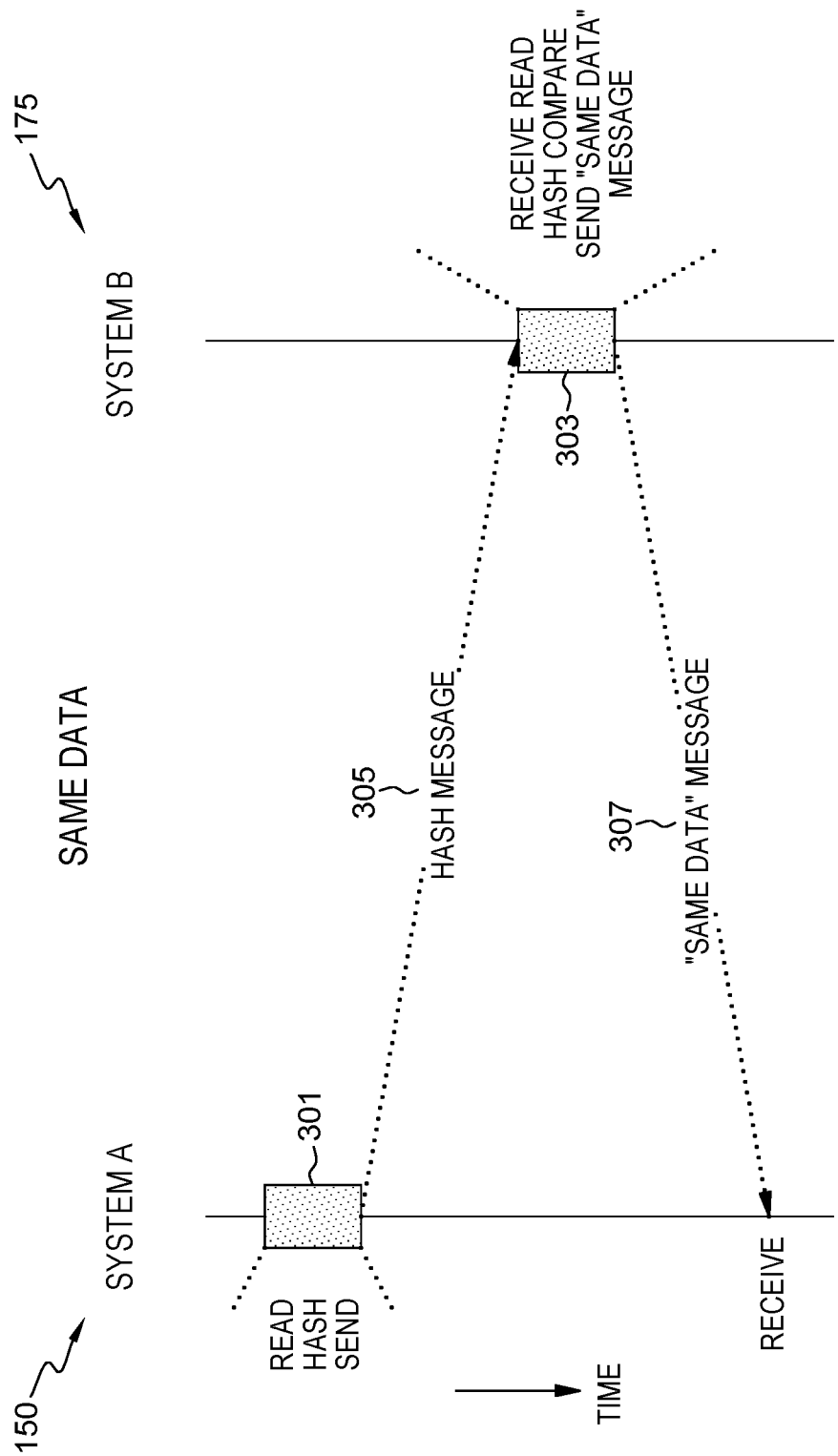
FIG. 3 depicts a message flow diagram illustrating the general process overview of hash-based data synchronization when the data is the same and there are no collisions, in accordance with an embodiment of the present invention.

The general process of the invention is illustrated in FIGS. 2 and 3. FIG. 2 shows the logical steps of the invention in a flowchart. In the following, for simplification, System A is leading the synchronization process, meaning that System A is initiating the general process and the processing of a given data chunk. System B is the system with the valid copy of the data: data will be copied from System B to System A.

At 201, System A reads the data it wants to be compared, then at 203 hashes it and sends the hash to System B at 205. The message System A sends to System B contains the hash and a header to identify which volumes and which logical block addresses (LBAs) correspond to the hash. When System B receives the hash at 207, System B knows to which volume and LBAs the hash corresponds based on the header and System B has all the information it needs to compare data. System B will then follow the same procedure performed by System A: read the data at 209 and hash it at 211. Once the hash of the data from System B is obtained, System B can compare the two hashes to look for differences at 213. When it is done, System B sends a message to System A that includes a result of the comparison for the concerned volume and LBAs. If the hashes are the same, System B transmits a "same data" message at 215 that is received by System A at 219. If the hashes differ, System B sends its copy of the data to System A at 217. System A then receives the copy of the data at 221 and writes the data at 223.

FIG. 3 depicts a message flow diagram illustrating the general process overview of hash-based data synchronization when the data is the same and there are no collisions, in accordance with an embodiment of the present invention.

At 301, System A initiates the synchronization process by reading and hashing the data before transmitting hash message 305 to System B using, for example, bandwidth via network 108. When System B receives hash message 305, it will process the same region of the same volume similar to System A, i.e. read and hash the data, compare the hashes, and transmit a message to System A at 303. In the case illustrated by FIG. 3 where the data is the same, System B transmits a "same data" message 307 to System A.

Figure 4:
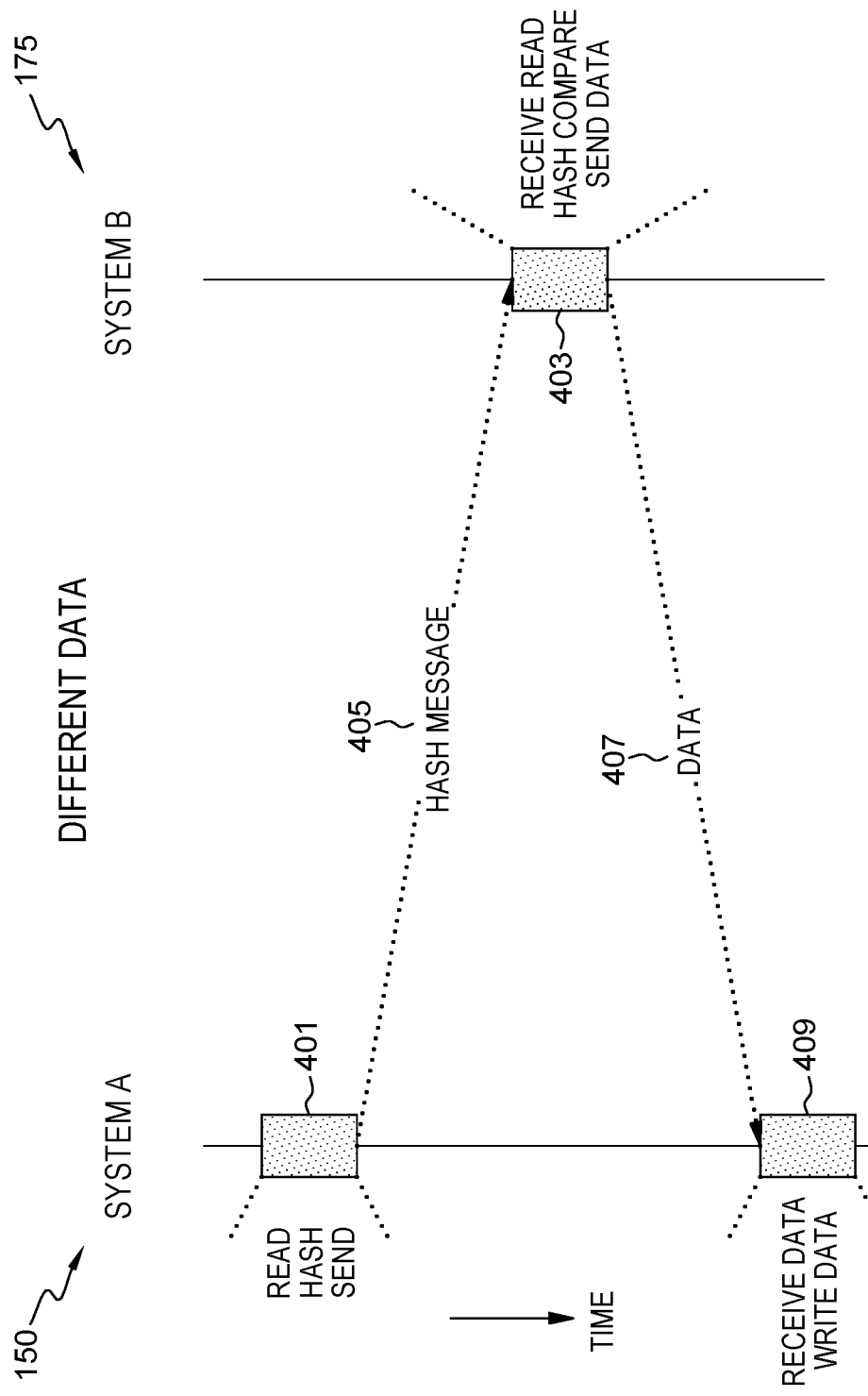
FIG. 4 depicts a message flow diagram illustrating the general process overview of hash-based data synchronization when the data is different and there are no collisions, in accordance with an embodiment of the present invention.

FIG. 4 depicts a message flow diagram illustrating the general process overview of hash-based data synchronization when the data is different and there are no collisions, in accordance with an embodiment of the present invention.

In terms of the general process, FIG. 4 is similar to FIG. 3 except the data stored on System A differs from that stored on System B. Thus, rather than transmitting a "same data" message 307, System B transmits the data that differs to System A, data 407. System A then receives and writes the data at 409.

Interaction with I/Os

Importantly, the present invention allows host I/Os to be performed during the synchronization process, and host I/Os will not be delayed because of the synchronization process. In particular, host I/Os not colliding with chunks being synchronized will have the same latency as if there was no ongoing synchronization process. Host I/Os colliding with chunks being synchronized will have an increased latency significantly less than the roundtrip-time between the systems. Here, a "collision" is defined as a host write outstanding from a host system that addresses an LBA currently being synchronized. FIGS. 2-4 addressed the basic case of synchronizing a chunk with no colliding host 10, and the following Figures address and introduce solutions to deal with collisions between host I/Os and chunks being synchronized.

Collision with Host I/Os

As mentioned previously, a collision with a host I/O occurs when a host I/O is being submitted to a data chunk that is in the process of being synchronized. Depending on the I/O, there are two scenarios: (1) the I/O read; and (2) the I/O write.

In case of a read, the I/O will not modify the data on the back-end storage. Thus, there is no problem with having a read to a chunk being processed while this chunk is being synchronized, provided that the read is addressed to the volume being synchronized from, i.e., System A in this exemplary case. It is assumed that System A and System B will coordinate to automatically dispatch reads to the copy of storage being synchronized from using means not described herein.

However, in case of a write, the I/O will modify the data on the back-end storage. As modifying the data will modify the corresponding hash, these collisions must be dealt with carefully. There are five different scenarios for collision with a host write, as will be explained in greater detail below.

Scenario 1: Collision with Host Write
Scenario 1: Option 1

Figure 5:
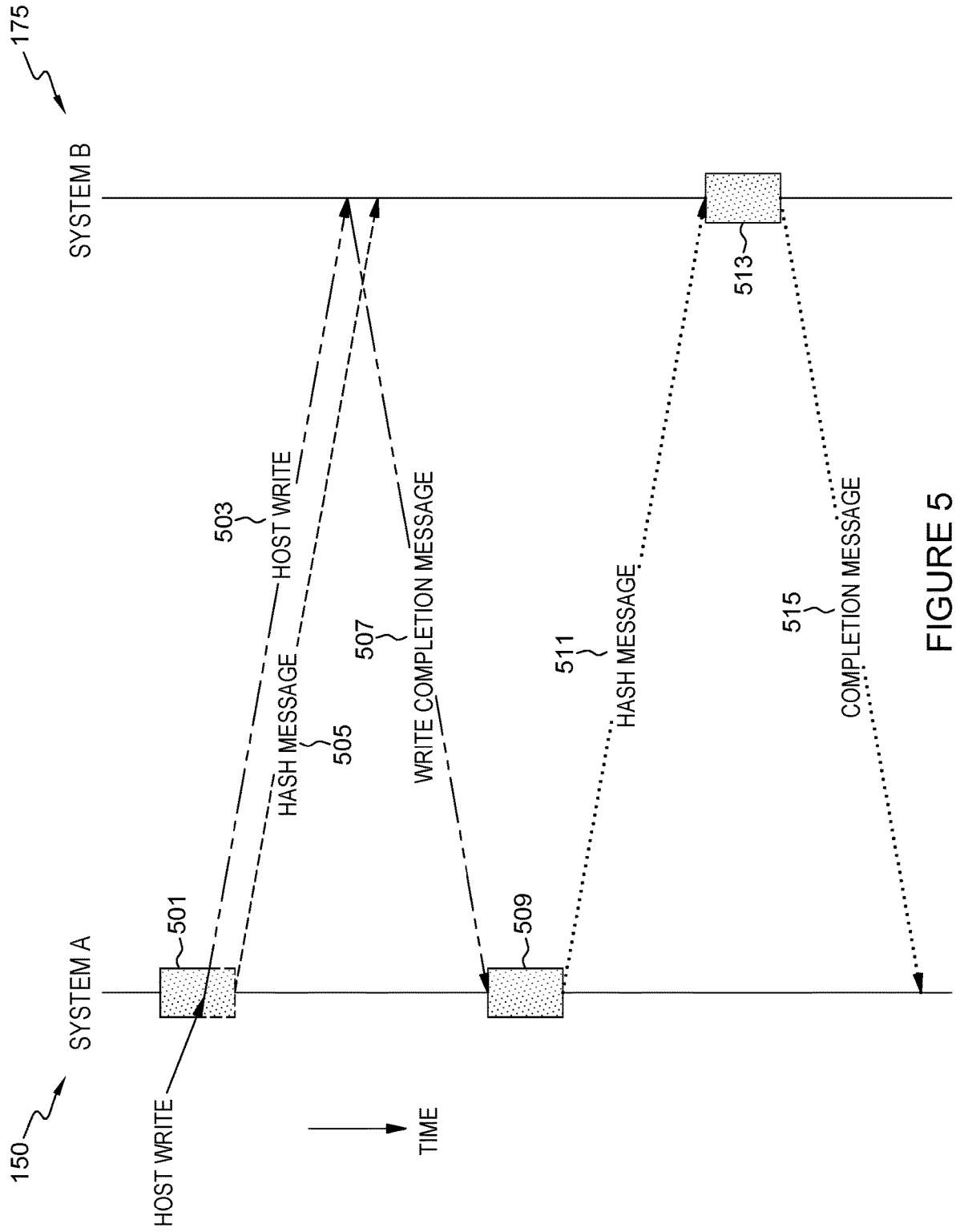
FIG. 5 depicts a message flow diagram illustrating a first option for the handling of a collision when a host write is received at system A while the chunk is being synchronized at system A, in accordance with an embodiment of the present invention.

FIG. 5 depicts a message flow diagram illustrating a first option for the handling of a collision when a host write is received at system A while a chunk is being synchronized at system A, in accordance with an embodiment of the present invention.

At 501, a host write is applied to System A while the chunk is being processed for synchronization at System A. The solution presented here is to delay the processing of the chunk synchronization at System A, then restart the synchronization process after the write is completed. Solid borders of block 501, i.e. the top, represent the initial synchronization process and the dotted part of the block, i.e. the bottom, represents the interrupted part of the process as time progresses. In embodiments, the comparison can be restarted as soon as the host write is received at System A, i.e. block 501, by transmitting hash message 505. In other embodiments, the comparison is restarted at 509 when System A receives write completion message 507 from System B by transmitting hash message 511. Block 509 and 513 respectively represent the synchronization processing of the chunk in either of the above embodiments for the data chunk after the collision has been detected and resolved. System B sends completion message 515 to System A at 513 that can be either a "Same data" message if both copies are identical, or the data itself if the copies differ, as was previously described. Thus, in this first option of scenario 1, System A can either (1) wait for the completion message from System B to be received by System A to restart the synchronization of the chunk, or (2) send the hash as soon as possible without waiting for the completion message from System B. These options are illustrated in FIG. 6, below.

Figure 6:
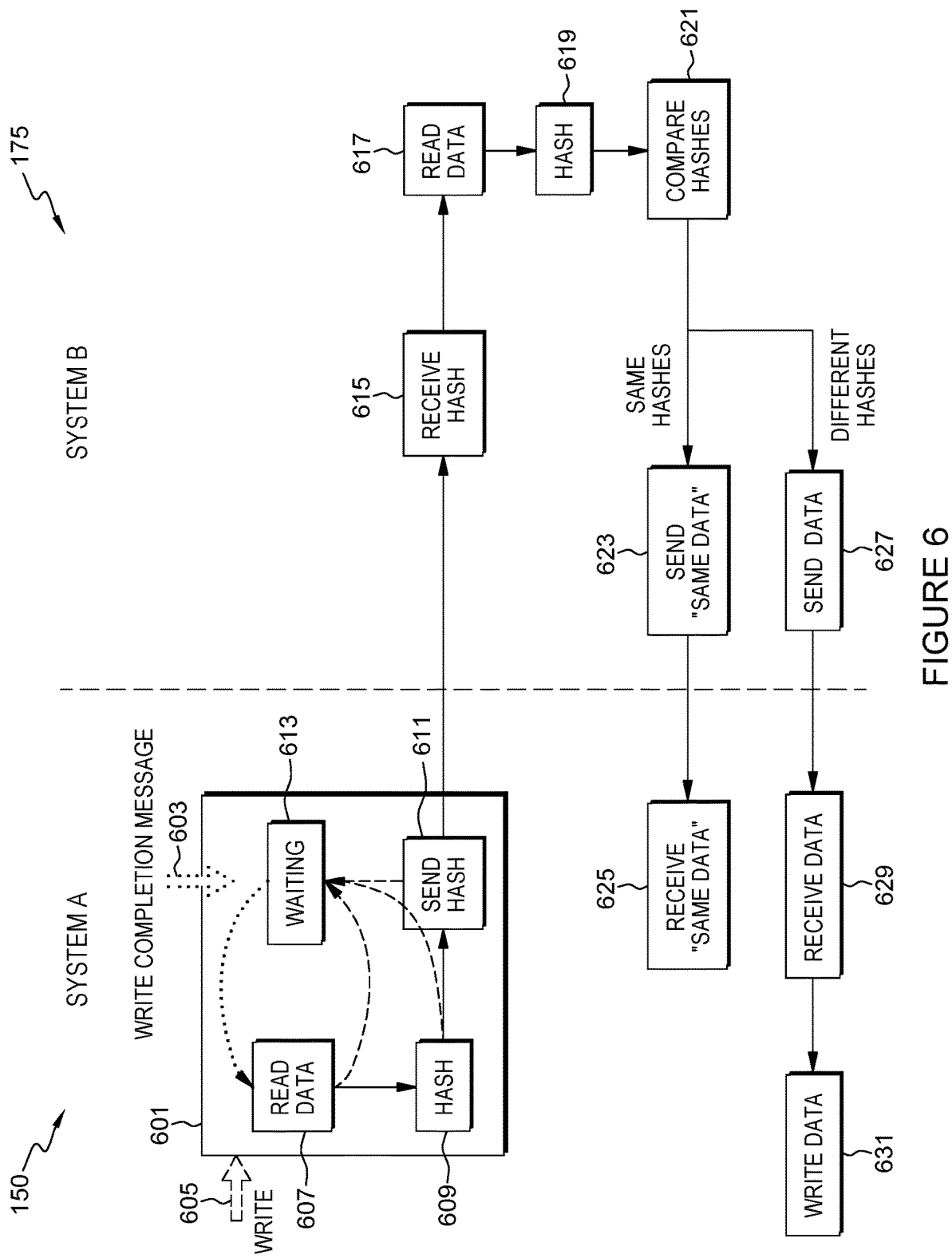
FIG. 6 depicts a flowchart illustrating the first option for the handling of a collision when a host write is received at system A while the chunk is being synchronized at system A, in accordance with an embodiment of the present invention.

FIG. 6 depicts a flowchart illustrating the first option for the handling of a collision when a host write is received at system A while the chunk is being synchronized at system A, in accordance with an embodiment of the present invention.

In FIG. 6, host write 605 is first received by System A. When the write is submitted to System A, System A will detect a collision. Regardless of where the chunk is in the System A synchronization process, represented by block 601, System A will quiesce any of read data 607, hash 609, or send hash 611 and the chunk will go into a waiting state at 613, representing option (1) described with respect to FIG. 5 above. System B will process the host write as if there were no synchronization for this chunk (not shown) and once System B has processed the host write, it sends completion message 603 to System A. Only when System A receives completion message 603 will it restart the synchronization process encompassed by block 601 for the chunk, at which point System B receives the hash at 615, reads the data at 617, hashes the data at 619, and compares the hashes at 621, much like the process illustrated by FIG. 2. Similarly, if the hashes are determined to be the same, System B sends a "Same data" message at 623 that is received by System A at 625. Alternatively, if the data is different, System B sends the data itself to System A at 627, after which it is received and written by System A at 629 and 631, respectively.

Alternatively, and representative of option (2) described with respect to FIG. 5 above, System A may immediately send hash 611 without waiting to receive a write completion message from System B. In this option, rather than waiting for System B to apply the write and restarting the synchronization process at System A after having received a write completion message from System B, System A immediately applies the write at 603 and sends hash at 611.

In the example embodiment, a subsequent collision between a host write and the comparison process in this or any other scenario would ordinarily drive the synchronization process to start yet again.

Scenario 1: Option 2

Figure 7:
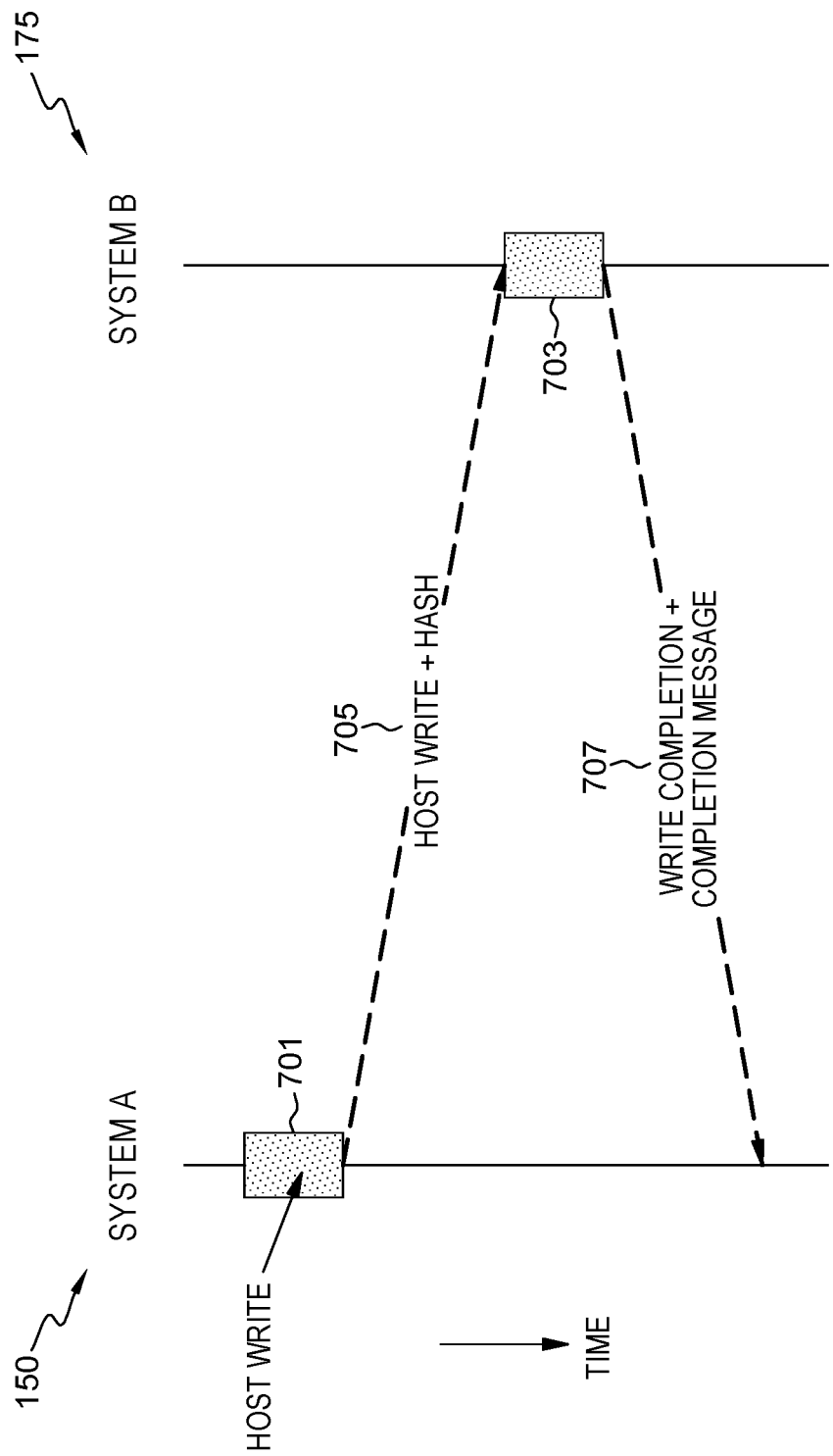
FIG. 7 depicts a message flow diagram illustrating a second option for the handling of a collision when a host write is received at system A while the chunk is being synchronized at system A, in accordance with an embodiment of the present invention.

FIG. 7 depicts a message flow diagram illustrating a second option for the handling of a collision when a host write is received at system A while a chunk is being synchronized at system A, in accordance with an embodiment of the present invention.

This alternative design is making use of the host write to: (1) speed up the synchronization process; and (2) reduce the use of bandwidth.

The alternative design consists in packing the host write with the hash when it is sent from System A to System B. The design is represented in FIG. 7, where at 701 System A transmits hybrid message 705 that includes the host write message and the synchronization message(s), which are all received by System B at 703. System B then transmits hybrid message 707, which includes a write completion message and a synchronization completion message.

Regardless of chosen design, there is an optimization in the case where the write is writing the entire chunk: with active-active technology, the host write will synchronize both copies, and thus synchronizing a chunk that is being entirely overwritten by a host write is wasteful. In the following options and collisions, only the case where the host write partially writes the chunk is considered, as additional steps are required in this case.

Figure 8:
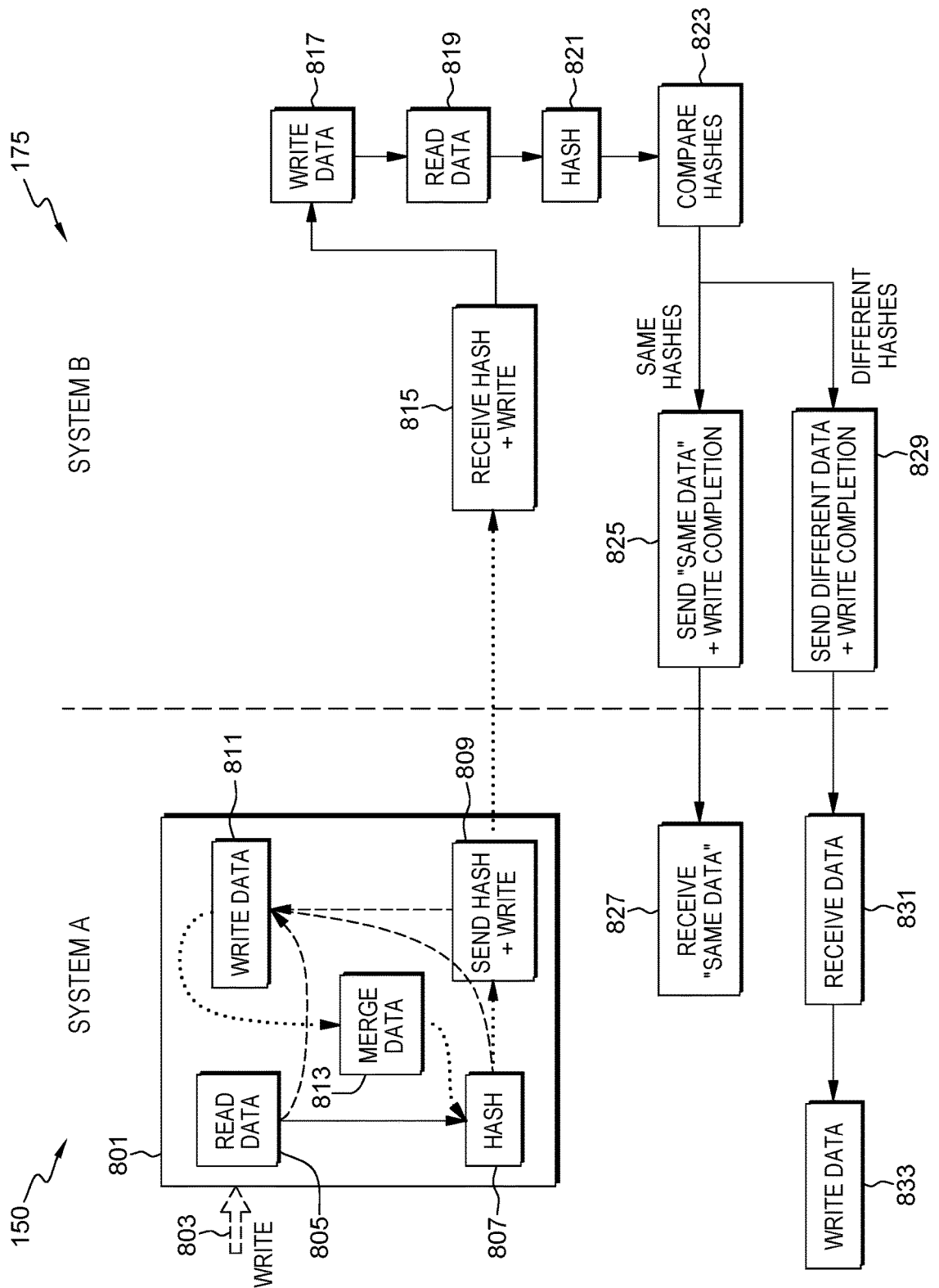
FIG. 8 depicts a flowchart illustrating the second option for the handling of a collision when a host write is received at system A while the chunk is being synchronized at system A, in accordance with an embodiment of the present invention.

FIG. 8 depicts a flowchart illustrating the second option for the handling of a collision when a host write is received at system A while the chunk is being synchronized at system A, in accordance with an embodiment of the present invention.

In this design, when System A receives the host write at 803, it reads the chunk at 805 while applying the write at 811. While having both a read and a write to the same chunk at the same time can be a problem for host I/Os, the invention takes advantage of the fact that performing a read and a write to the same chunk gives no guarantee on what the read will return (old data, new data, or a mix of both), while the write will be processed normally. Thus, the write can be processed normally at 801 in the context of the active-active technology (it will be replicated to the other system normally, too). When the read is done, System A will merge it with the write at 813: the LBAs affected by the write will be written into the read data, while the others will not. Thus, the data in the read will represent the current state of the chunk without requiring an additional read. Then this chunk is processed normally, i.e. System A hashes the data at 807, then sends the write and the hash to System B at 809. Thus, the hash System A is sending to System B describes the new data. When System B receives the write and the hash at 815, it must apply the write first at 817. System B then reads the data at 819, hashes the data at 821, and compares the hashes at 823.

As in the case above, if hashes are the same, System B sends the completion message to System A at 825, in which it will also embed the host write completion message, both of which System A receives at 827.

If hashes are different, and with the systems aware that the host write has partially synchronized the chunk, there is no need to send the entire chunk from System B to System A. Thus, System B may only send to System A the part of the chunk that was not overwritten by the host write at 829. In addition, System B will embed in this message to System A the host write completion message, both of which System A receives at 831 for write at 833. Omitting the part overwritten by the host write at 829 may either degrade or improve performance, and thus this step of the process is optional according to the specific performance characteristics of the storage system In FIG. 8, the impact of host write 803 on processing 801 of the chunk and of the host write is illustrated by the long, dotted arrows within box 801, i.e. arrows ending at write data 811. System A cancels its processing of the chunk after having read the host write, then applies the host write at 811. The system then follows the short, dotted arrows within box 801, i.e. the read is overwritten by the write at merge data 813 and the new chunk is hashed at 807 before being transmitted to System B at 809 where it is processed normally.

Scenario 2: Collisions with Host Write

In the following scenario, System A receives a host write to be applied to a data chunk for which the hash has already been sent to System B and System B will receive the host write while processing the same data chunk for synchronization. Note that we can rely on messages not overtaking each other between System A and System B, as communication between systems is assumed to be ordered.

Scenario 2: Option 1

Figure 9:
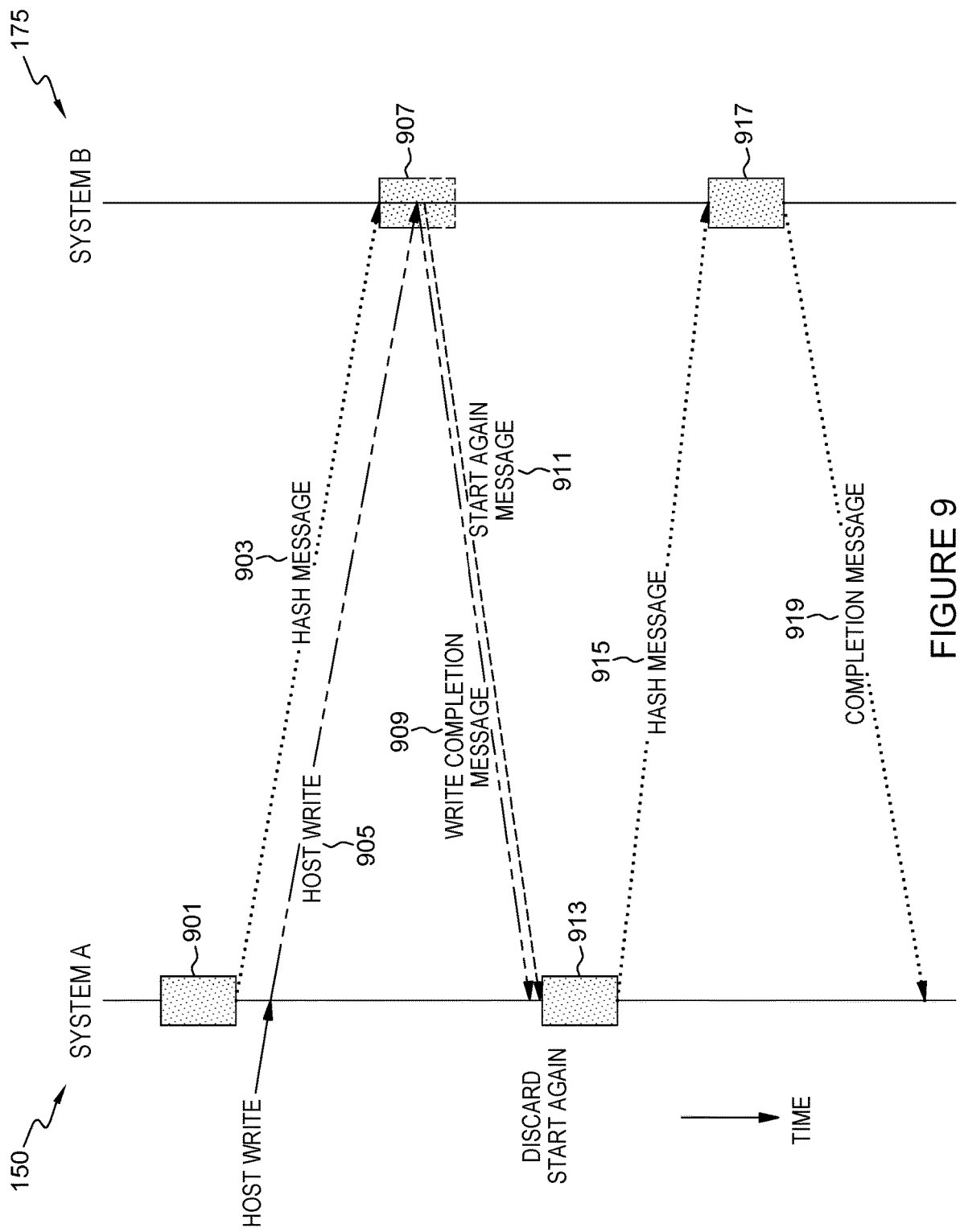
FIG. 9 depicts a message flow diagram illustrating a first option for the handling of a collision when a host write is applied at system A while the chunk is being synchronized at system B, in accordance with an embodiment of the present invention.

FIG. 9 depicts a message flow diagram illustrating a first option for the handling of a collision when a host write is applied at system A while the chunk is being synchronized at system B, in accordance with an embodiment of the present invention.

Here, System A begins the synchronization process at 901 and transmits hash message 903 to System B before receiving the host write. System A then transmits host write 905 to System B which receives it after receiving hash message 903. Because System B receives host write 905 after receiving hash message 903, it detects the collision and cancels the processing of the chunk at 907 to allow host write 905 to be applied as soon as possible.

If host write 905 is affecting the entire chunk, the active-active technology will synchronize the chunk. Assuming this, synchronizing the grain by the synchronization process is wasteful, so System B simply sends completion message 909 to System A saying that the host write was completed and that both copies contain the same data.

If host write 905 is only partially writing the chunk, then synchronization still must be performed. Thus, when System B sends host write completion message 909 to System A, it will also send "Start again" message 911 so System A processes the chunk again for synchronization at 913. Accordingly, when System A receives "Write completion" message 909 and "Start again" message 911, it restarts the synchronization process by sending hash message 915 to System B, where System B processes the hash at 917. System B then transmits "Completion" message 919 to System A.

Figure 10:
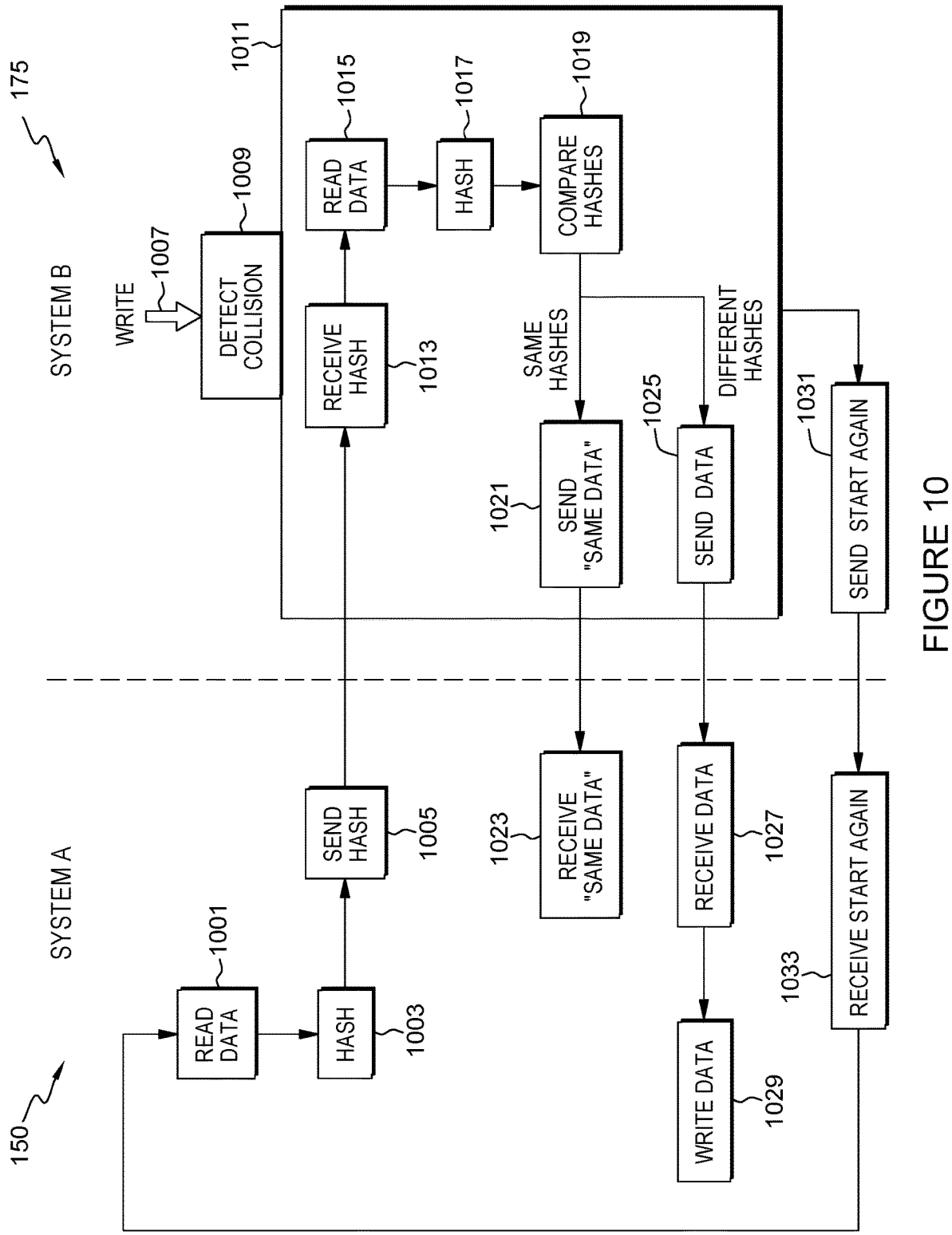
FIG. 10 depicts a flowchart illustrating the first option for the handling of a collision when a host write is applied at system A while the chunk is being synchronized at system B, in accordance with an embodiment of the present invention.

FIG. 10 depicts a flowchart illustrating the first option for the handling of a collision when a host write is applied at system A while the chunk is being synchronized at system B, in accordance with an embodiment of the present invention.

In FIG. 10, host write 1007 is received by System B and a collision is detected at 1009. Upon detecting the collision at 1009, System B will discard processing of the chunk wherever it is in the comparison process, illustrated by steps encompassed by block 1011, and will instead send a "start again" message at 1031 to System A. When System A receives the "Start Again" message at 1033, it begins to process the chunk again normally.

Scenario 2: Option 2

Figure 11:
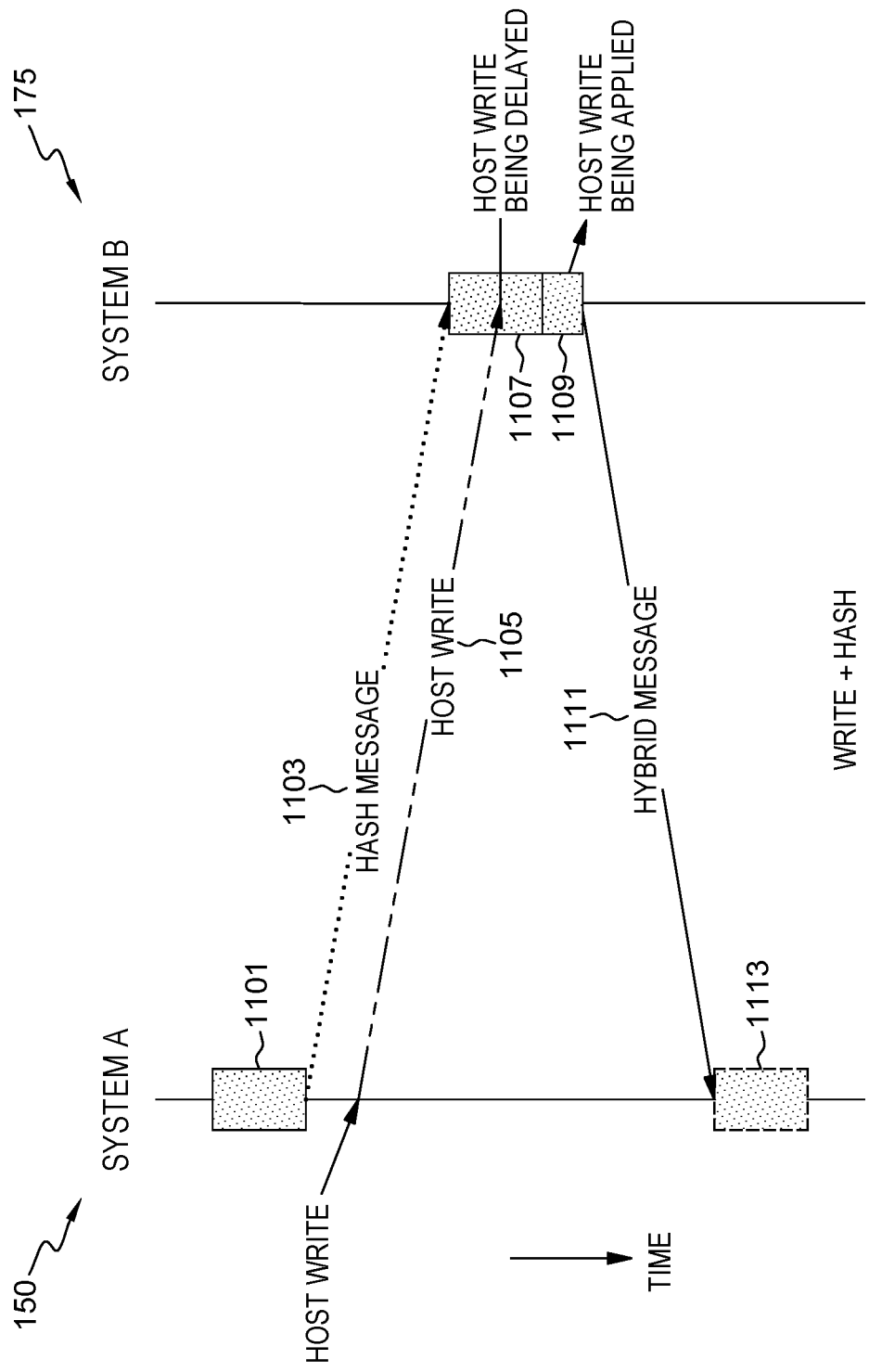
FIG. 11 depicts a message flow diagram illustrating a second option for the handling of a collision when a host write is applied at system A while the chunk is being synchronized at system B, in accordance with an embodiment of the present invention.

FIG. 11 depicts a message flow diagram illustrating a second option for the handling of a collision when a host write is applied at system A while the chunk is being synchronized at system B, in accordance with an embodiment of the present invention.

An alternative to option 1 of scenario 2 above consists in delaying the host write at System B until the hashes have been compared. Like above, System A processes the chunk at 1101 and transmits hash message 1103 to System B before receiving host write 1105 and similarly transmitting that to System B. Then, instead of sending a message to System A indicating that the copies contain the same data for this chunk or sending the data for a resynchronization, System B will delay the host write at 1107 and apply the write at 1109. After applying the write, System B sends hybrid message 1111 to System A as follows: if hashes are the same, System B sends a completion message to System A saying that both copies contain identical data and that the host write has been completed; if hashes are different, System B sends a host write completion message to System A together with the data of the chunk that does not overlap with the host write. This implies that if the host write has overwritten the entire chunk, then there will be no data to send to System A. When System A receives hybrid message 1111 from System B, System A knows the host write has been applied properly and has instructions regarding the synchronization of the chunk at 1113.

Figure 12:
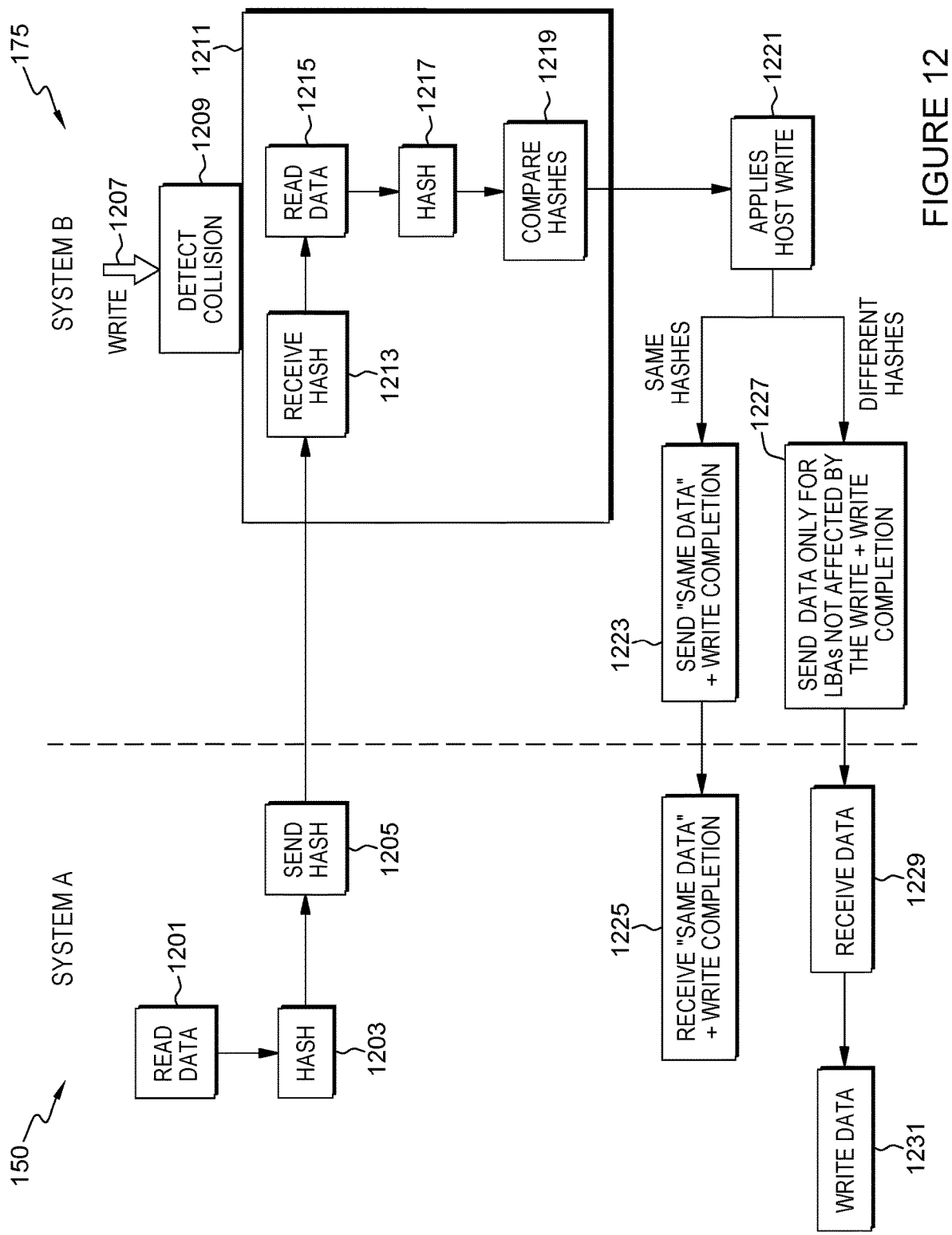
FIG. 12 depicts a flowchart illustrating the second option for the handling of a collision when a host write is applied at system A while the chunk is being synchronized at system B, in accordance with an embodiment of the present invention.

FIG. 12 depicts a flowchart illustrating the second option for the handling of a collision when a host write is applied at system A while the chunk is being synchronized at system B, in accordance with an embodiment of the present invention.

In FIG. 12, System B receives host write 1207 from System A and a collision is detected at 1209. When System B detects the collision, it will delay host write 1207 and apply it at 1221 only after having completed the synchronization steps encompassed by block 1211, i.e. receive hash at 1213, read data at 1215, hash data at 1217, and compare hashes at 1219. It will then send the correct information to System A based on both the result of the hash comparison and whether the host write has entirely overwritten the chunk. More specifically, if the hashes are the same, System B will send a "Same Data" write completion message at 1223 that is received by System A at 1225. Otherwise, if the hashes differ, System B sends a message including data only for LBAs not affected by the write and a write completion message at 1227, which is received by System A at 1229 where System A writes the data at 1231.

This design will also be applied in case of repeated writes to the same chunk so that the synchronization of this chunk can complete and release resources without retaining them for too long. This would be particularly useful in the case of several chunks being repeatedly written to, as, without this alternative, we can end up using all the synchronization resources and still being stuck.

Scenario 3: Collision with Host Write

In this scenario, instead of the host write being submitted to System A, the host write is submitted to System B, and thus the write is being replicated the reverse direction to the comparison process.

Figure 13:
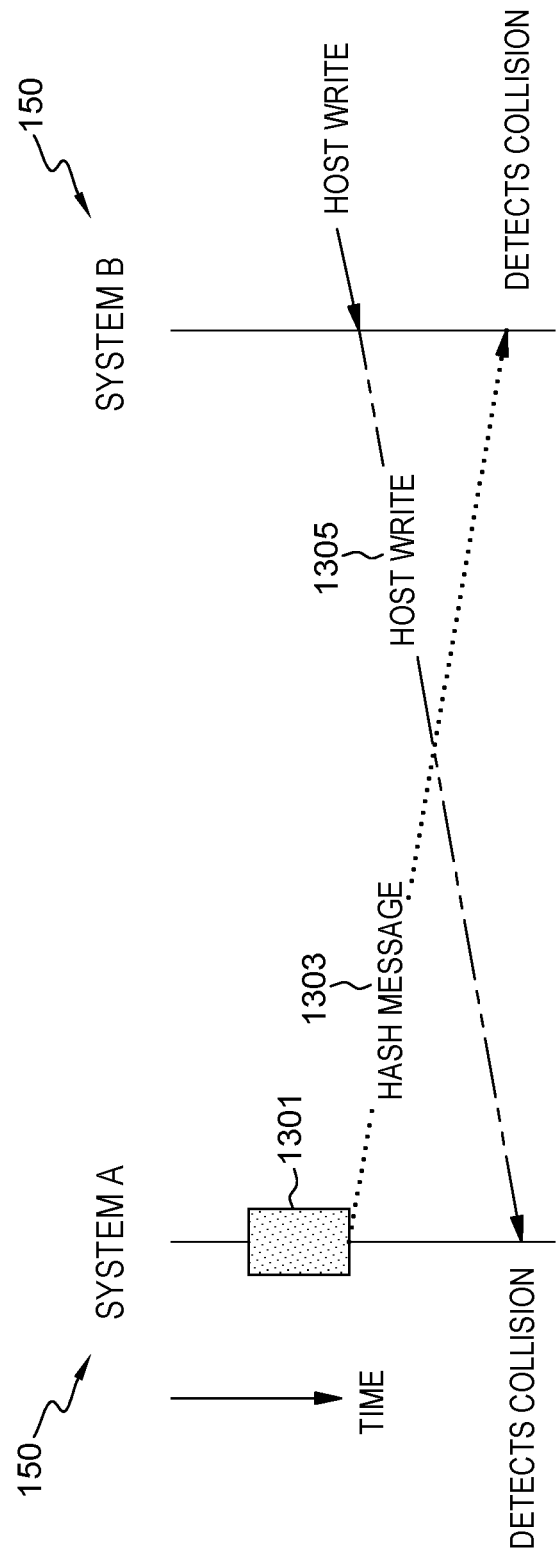
FIG. 13 depicts a message flow diagram illustrating a collision in which system B receives and transmits a host write to system A prior to receiving a hash message from system A, in accordance with an embodiment of the present invention.

This scenario is shown in FIG. 13, which depicts a message flow diagram illustrating a collision in which system B receives and transmits a host write to system A prior to receiving a hash message from system A, in accordance with an embodiment of the present invention. Here, both systems detect the collision and System B receives and replicates host write 1305 before it receives hash message 1303 that System A processed at 1301.

When each respective system receives each respective message from each other, it detects the collision. As higher priority is given to host write 1305, System A applies the write and returns completion to System B as soon as possible. This means that System B is the one that deals with the collision and provides a solution that will lead to both copies being identical. There are three options for handling this scenario, described herein.

Scenario 3: Option 1

Figure 14:
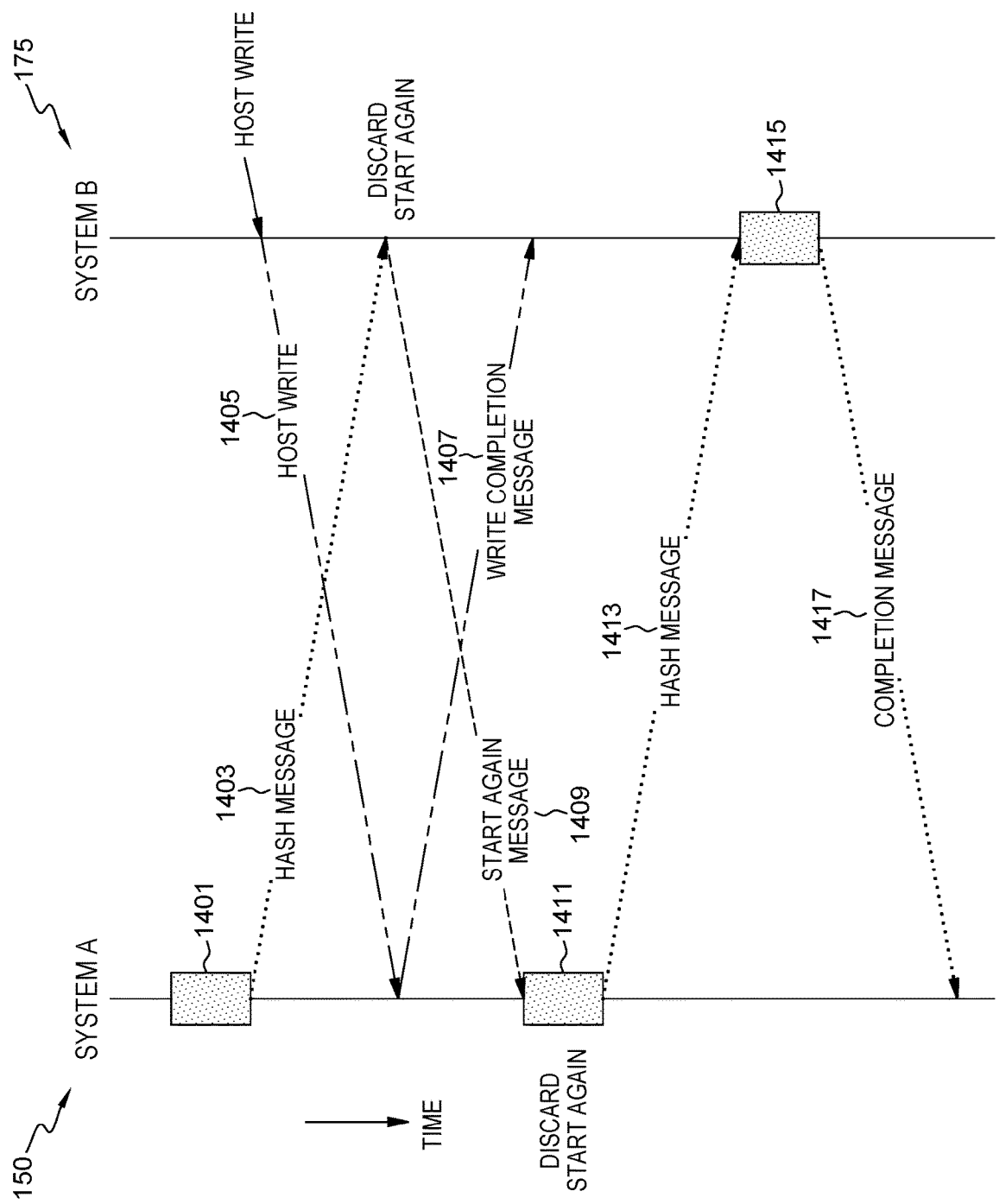
FIG. 14 depicts a message flow diagram illustrating a first option for the handling of a collision when system B receives and transmits a host write to system A prior to receiving a hash message from system A, in accordance with an embodiment of the present invention.

FIG. 14 depicts a message flow diagram illustrating a first option for the handling of a collision when system B receives and transmits a host write to system A prior to receiving a hash message from system A, in accordance with an embodiment of the present invention.

In this scenario, when System B detects the collision, it will discard the processing of the chunk and will send "start again" message 1409 to System A for the chunk. When System A receives "Start Again" message 1409 at 1411, it knows to process the chunk again and that there are no other outstanding messages for this chunk. Thus, System A starts the synchronization process again at 1411 and transmits hash message 1413 to System B. After receiving hash message 1413, System B processes the hash and transmits completion message 1417 to System A.

Figure 15:
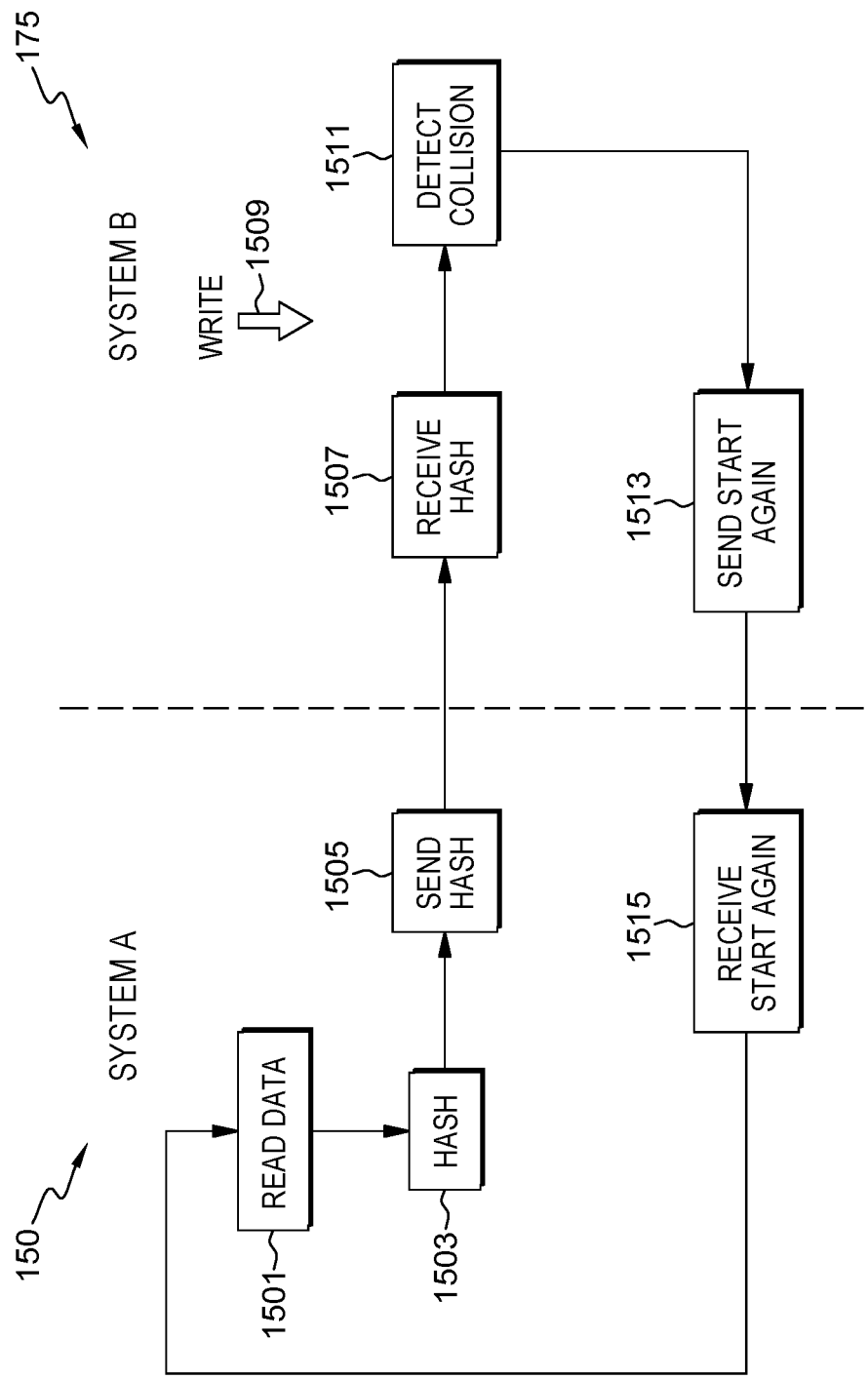
FIG. 15 depicts a flowchart illustrating the first option for the handling of a collision when system B receives and transmits a host write to system A prior to receiving a hash message from system A, in accordance with an embodiment of the present invention.

FIG. 15 depicts a flowchart illustrating the first option for the handling of a collision when system B receives and transmits a host write to system A prior to receiving a hash message from system A, in accordance with an embodiment of the present invention.

Here, host write 1509 is received by System B after receiving a hash message from System A at 1507. When System B detects the collision at 1511, System B cancels its processing of the chunk and sends "Start Again" message 1513 to System A. When System A receives the "Start Again" message at 1515, it starts processing the chunk normally again at 1501.

Scenario 3: Option 2

Figure 16:
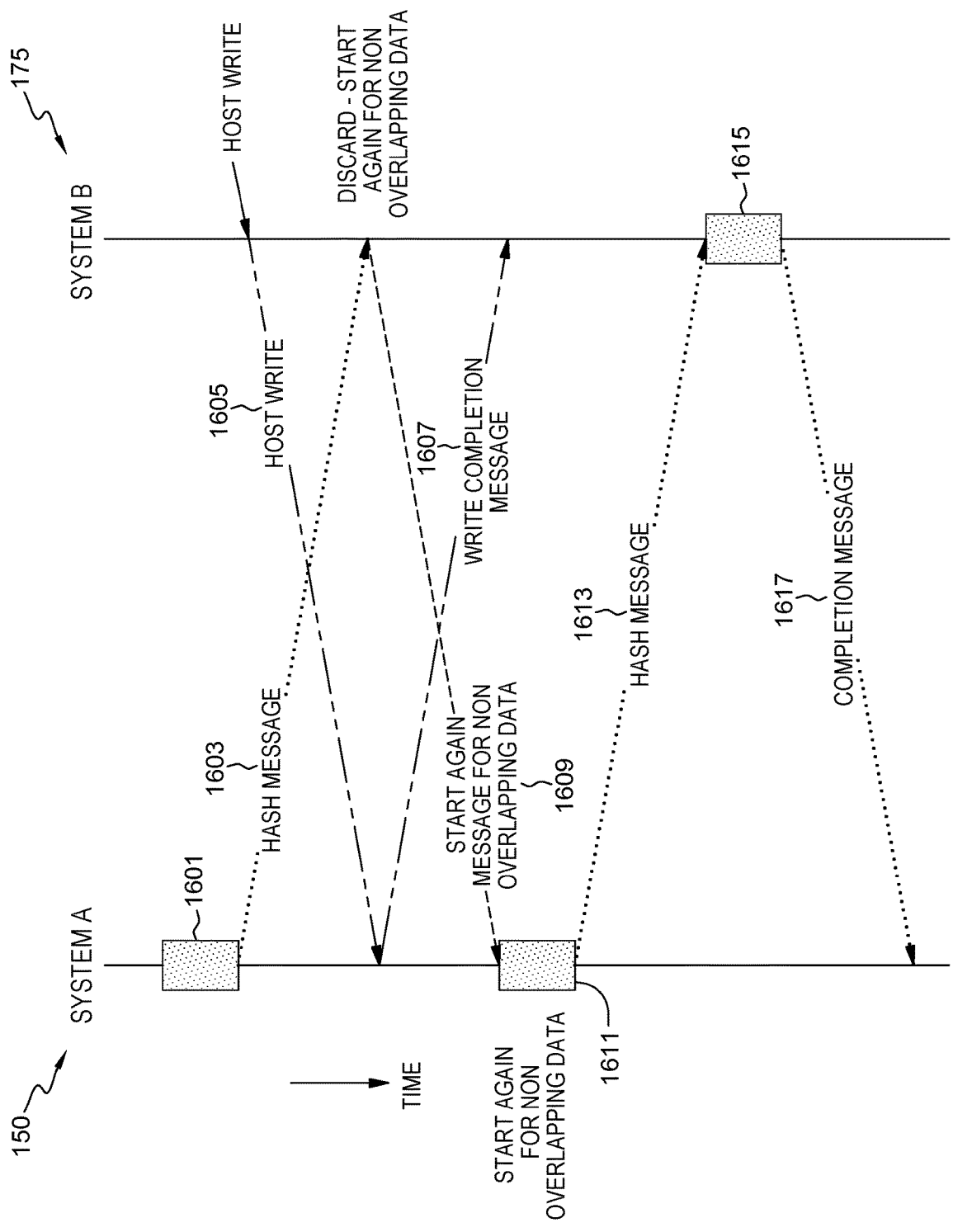
FIG. 16 depicts a message flow diagram illustrating a second option for the handling of a collision when system B receives and transmits a host write to system A prior to receiving a hash message from system A, in accordance with an embodiment of the present invention.

FIG. 16 depicts a message flow diagram illustrating a second option for the handling of a collision when system B receives and transmits a host write to system A prior to receiving a hash message from system A, in accordance with an embodiment of the present invention.

Presented herein is an alternative option to Scenario 3. As both systems detected the collision, and as the host write has partially synchronized the chunk, synchronizing the entire chunk is wasteful. Rather, System B sends "Start Again" message 1609 to System A specifying that the completion is for non-overlapping data only. As System A has also detected the collision, it expects this message and will know prior to receiving "Start Again" message 1609 which parts of the chunk to potentially be synchronized. Thus, when System A receives the message from System B, it will start processing the chunk again at 1611.

Concerning the read, System A will either read the entire chunk or only the non-overlapping part of the chunk. Indeed, if the write has overwritten a contiguous region of the chunk and if this region is at the beginning or at the end of the chunk, then the remaining portion of the chunk can be synchronized. Otherwise, instead of splitting the chunk into two or more regions requiring synchronization, System A will read the whole chunk.

Once System A has read the data at 1611, it will hash it and send hash message 1613 to System B with a flag telling it that this is partial synchronization and which part of the chunk is concerned. When System B receives the message at 1615, it reads the data in the same way System A did, then computes the hash and compares it with the hash from System A in hash message 1613.

If the hashes differ, System B will send only the non-overlapping data to System A in completion message 1617. Otherwise, it will just send a completion message to System A at 1617, indicating data is the same on both copies.

This design has two advantages over the first option of scenario 3 in that: (1) it potentially reads less data, which will decrease the read duration and the hash computation; and (2) it potentially sends less data, thus using less bandwidth.

Figure 17:
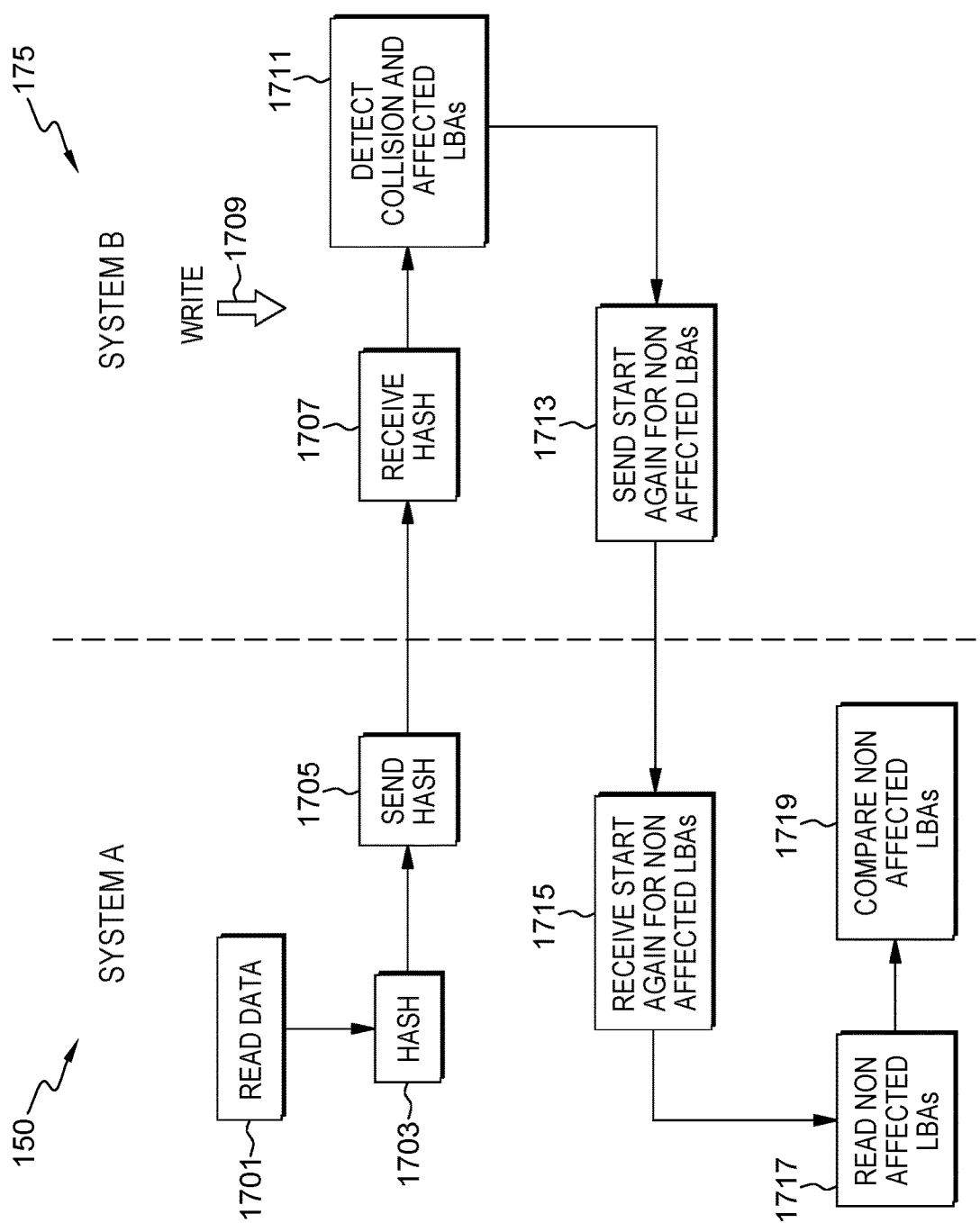
FIG. 17 depicts a flowchart illustrating the second option for the handling of a collision when system B receives and transmits a host write to system A prior to receiving a hash message from system A, in accordance with an embodiment of the present invention.

FIG. 17 depicts a flowchart illustrating the second option for the handling of a collision when system B receives and transmits a host write to system A prior to receiving a hash message from system A, in accordance with an embodiment of the present invention.

System B receives host write 1709 and detects a collision when System B receives the hash from System A at 1707. After detecting the collision, System B sends a "Start Again for Non-Overlapping LBAs" message to System A at 1713. When System A receives the "Start Again for Non-Overlapping LBAs" message at 1715, System A starts processing the partial chunk by reading the non-affected LBAs at 1717 and comparing non-affected LBAs at 1719.

Scenario 3: Option 3

Figure 18:
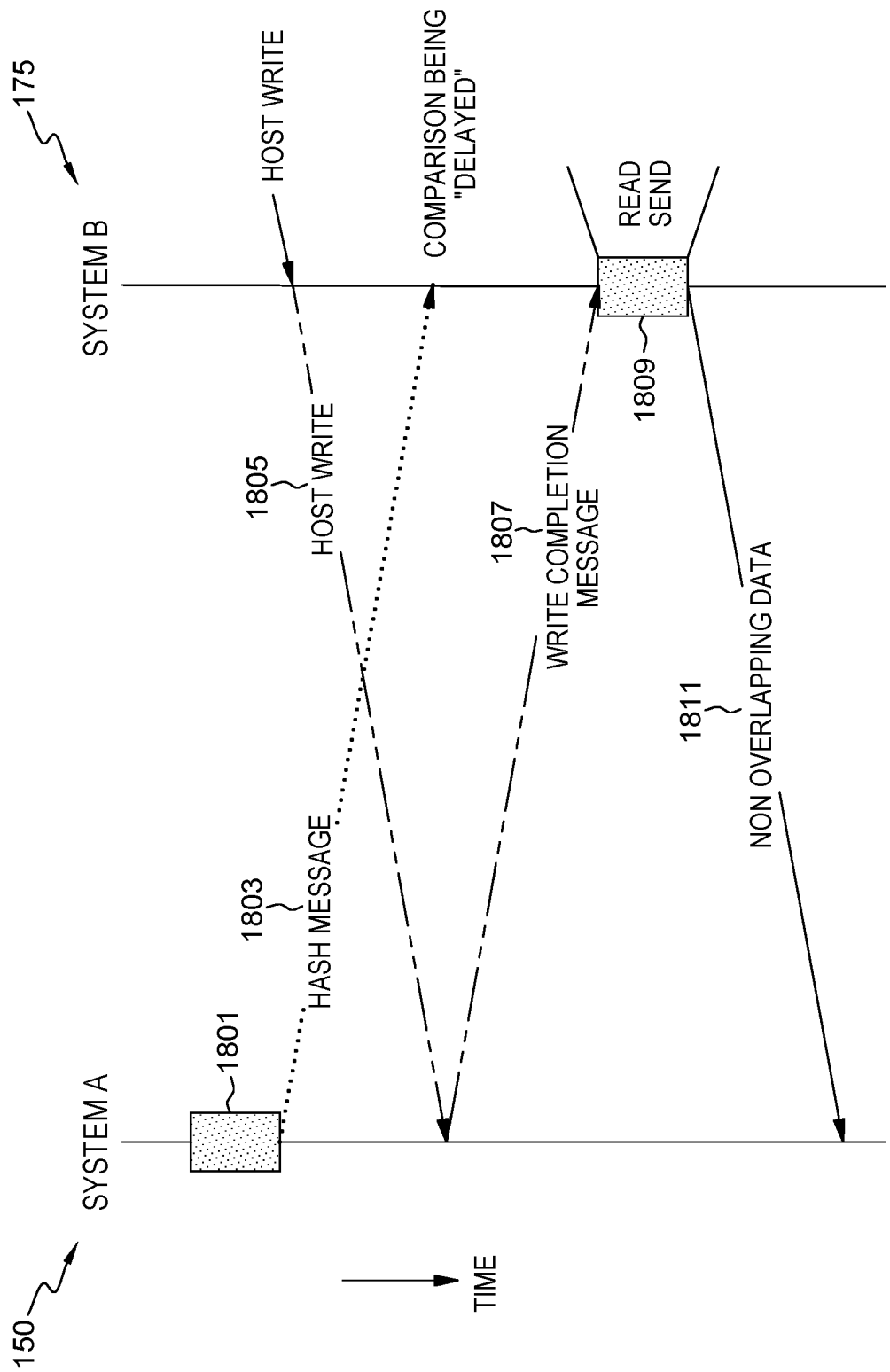
FIG. 18 depicts a message flow diagram illustrating a third option for the handling of a collision when system B receives and transmits a host write to system A prior to receiving a hash message from system A, in accordance with an embodiment of the present invention.

FIG. 18 depicts a message flow diagram illustrating a third option for the handling of a collision when system B receives and transmits a host write to system A prior to receiving a hash message from system A, in accordance with an embodiment of the present invention.

The third solution to this collision consists in delaying the synchronization of the chunk at System B until it receives the write completion from System A. As System B has already applied the write to its own copy, reading the old data on System B is impossible. Also, as System A has already sent its hash and as host writes are applied as soon as possible, the old data does not exist anymore on the copy at System A. The previous designs solved this by starting the processing of the chunk again (the chunk being partial or not). This solution, however, proposes to "discard" the comparison process at System B: System B will read the data and send the non-overlapping part of the chunk to System A where it will be written. This solution is described in FIG. 18.

When System B receives hash message 1803 from System A, it will delay the processing of the chunk. Once System B receives write completion message 1807 from System A, it will read the data at 1809 and send non-overlapping data 1811 to System A to write it and make both copies identical.

Figure 19:
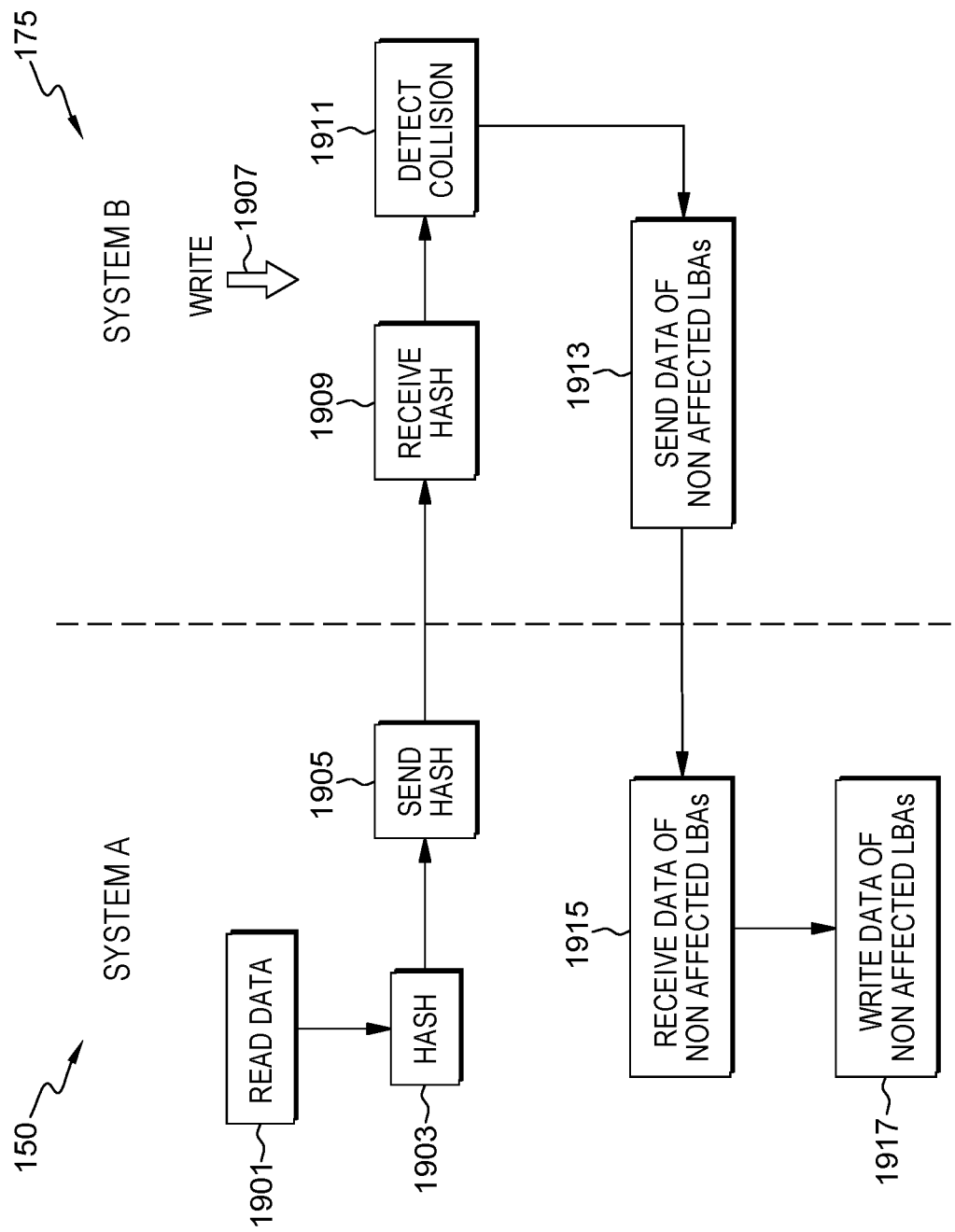
FIG. 19 depicts a flowchart illustrating the third option for the handling of a collision when system B receives and transmits a host write to system A prior to receiving a hash message from system A, in accordance with an embodiment of the present invention.

FIG. 19 depicts a flowchart illustrating the third option for the handling of a collision when system B receives and transmits a host write to system A prior to receiving a hash message from system A, in accordance with an embodiment of the present invention.

System B receives host write 1907 and the collision is detected when System B receives the hash from System A at 1909. After detecting the collision, System B directly sends the data of the chunk without computing the hash and comparing it with the hash from System A at 1913. When System A receives the data at 1915, System A writes the data to make both copies identical at 1917.

This solution presents several advantages compared to the previous designs, in that: (1) System B has no hash to compute, which speeds up the process; (2) there is no start again message, which again speeds up the process and helps save bandwidth; and (3) System A does not have to read partially or not the chunk, hash it again, and send the hash again to System B, which saves bandwidth and resources to read and compute the hash.

This is only at the cost of potentially increased bandwidth use when having identical data, in which case we end up sending part of the chunk to write it on System A's copy. However, this is not obvious as it depends on the size of the host write: if the non-overlapping data is smaller than the hash message sent by System A and the "same data" message sent by System B, then there is still a net gain of bandwidth. Otherwise, the use of bandwidth is increased.

Scenario 3: Option 4

In a last option of scenario 3, System B sends its hash to System A for System A to compare (not shown). Here, rather than sending the data of the affected chunk to System B after detecting the collision (shown in FIG. 19 at block 1913), System B sends a hash of the data chunk, thereby saving bandwidth.

Scenario 4: Collision with Host Write

Figure 20:
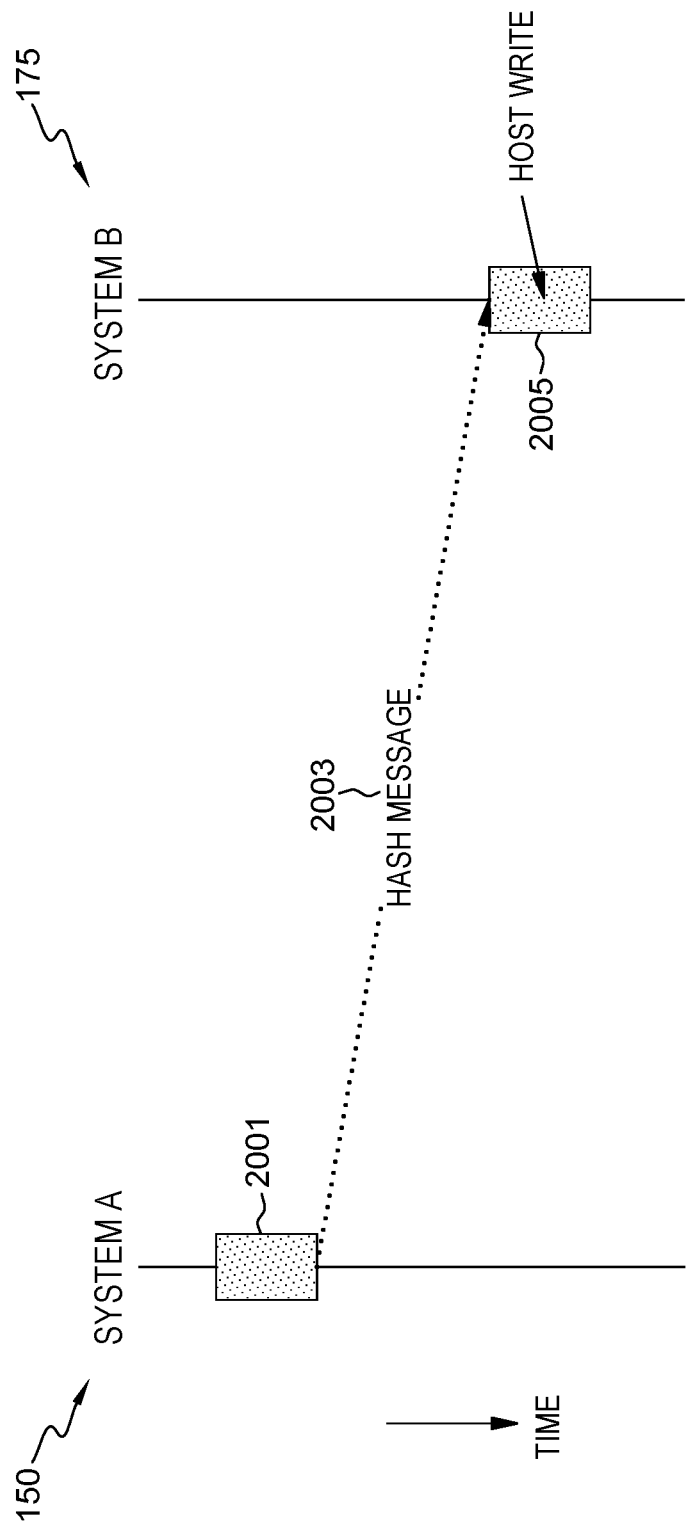
FIG. 20 depicts a message flow diagram illustrating a collision in which system B receives a host write while processing the chunk for synchronization, in accordance with an embodiment of the present invention.

Scenario 4 is illustrated by FIG. 20 and describes a collision in which System B receives a host write while processing a chunk for synchronization, in accordance with an embodiment of the present invention. System A begins processing a chunk at 2001 and sends hash message 2003 to System B. System B, while processing hash message 2003, receives a host write.

Scenario 4: Option 1

Figure 21:
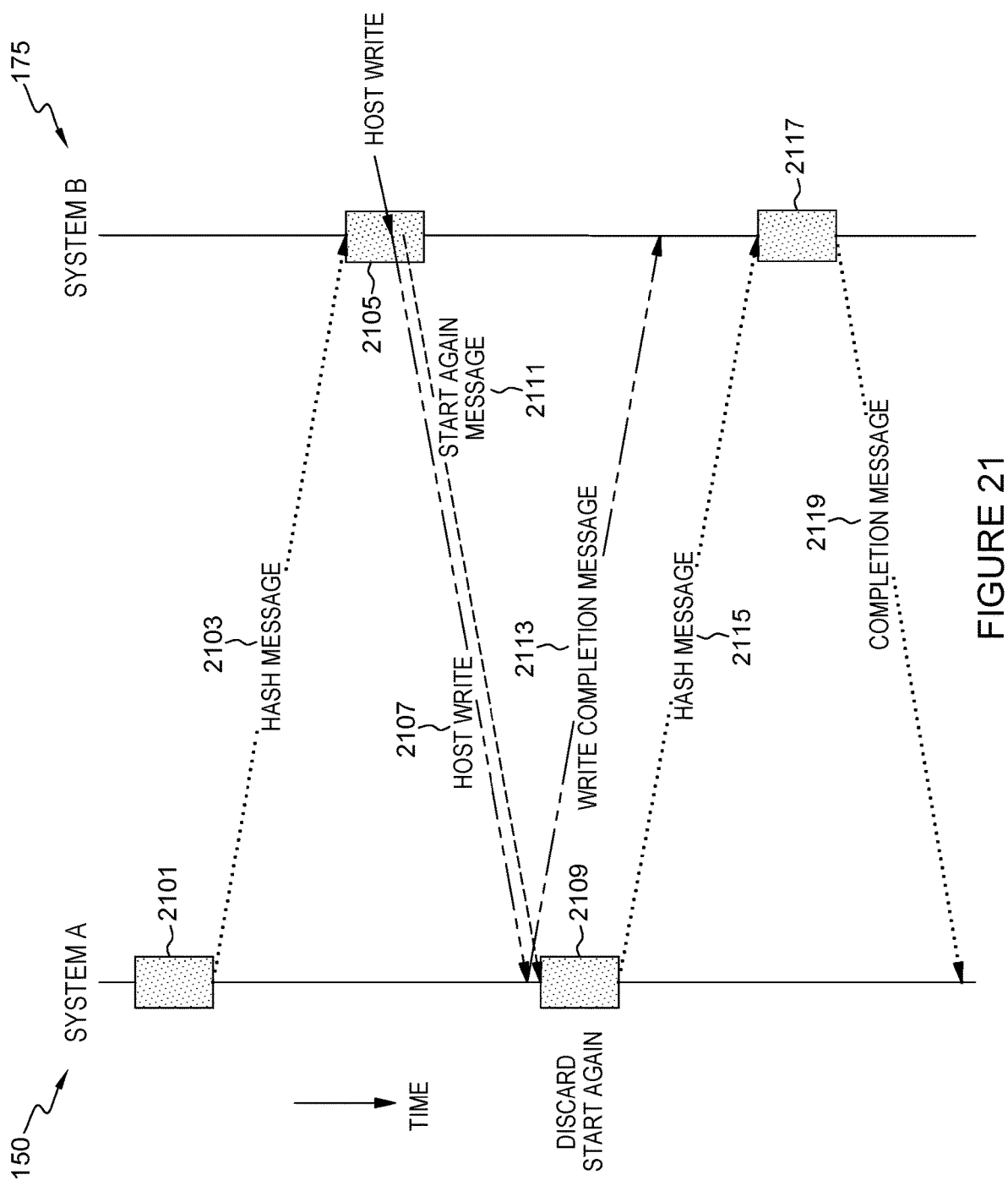
FIG. 21 depicts a message flow diagram illustrating a first option for the handling of a collision when system B receives a host write while processing the chunk for synchronization, in accordance with an embodiment of the present invention.

FIG. 21 depicts a message flow diagram illustrating a first option for the handling of a collision when System B receives a host write while processing the chunk for synchronization, in accordance with an embodiment of the present invention.

The first option consists in cancelling the processing of the chunk on System B to apply the host write as soon as possible. Thus, when System B receives a host write while processing hash message 2103 at 2105, System B cancels processing the chunk and immediately applies the host write. System B then sends host write 2107 and "Start Again" message 2111 to System A, which applies the host write and then starts the processing of the chunk again at 2109. Processing of the chunk continues normally with System A transmitting hash message 2115 to System B, which processes the message at 2117 and transmits completion message 2119 back to System A. This scenario is depicted in FIG. 21.

Figure 22:
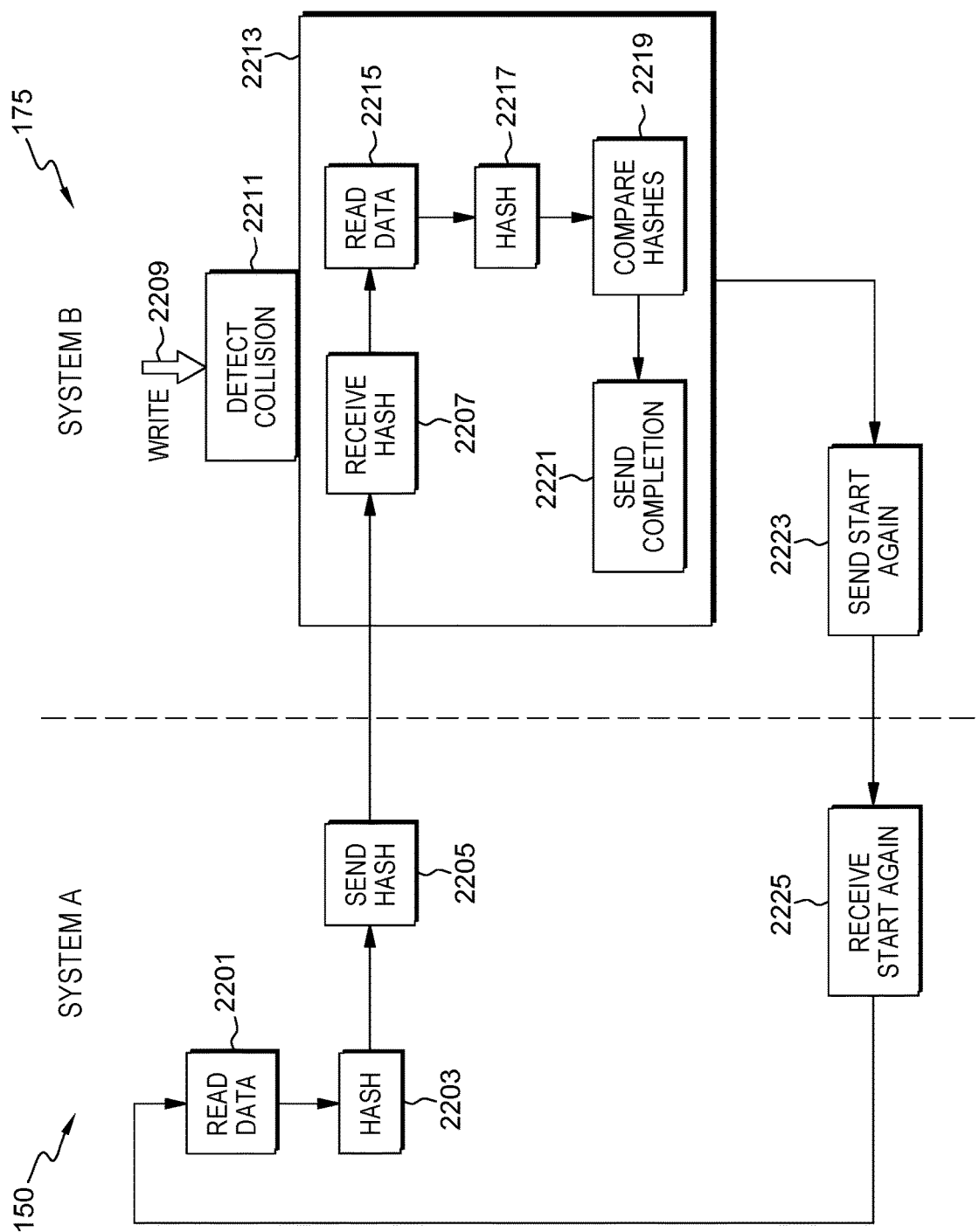
FIG. 22 depicts a flowchart illustrating the first option for the handling of a collision when system B receives a host write while processing the chunk for synchronization, in accordance with an embodiment of the present invention.

FIG. 22 depicts a flowchart illustrating the first option for the handling of a collision when system B receives a host write while processing the chunk for synchronization, in accordance with an embodiment of the present invention.

System B first receives a hash from System A at 2207 before receiving host write 2209 and detecting a collision at 2211 while System B is processing the chunk at any point in block 2213. After detecting the collision, System B cancels processing of the chunk operations encompassed by block 2213 to apply the write. In addition, System B transmits the write and a "start again" message to System A at 2223. When System A receives the message at 2225, it first applies the write and then starts processing the chunk again at 2201.

Scenario 4: Option 2

Figure 23:
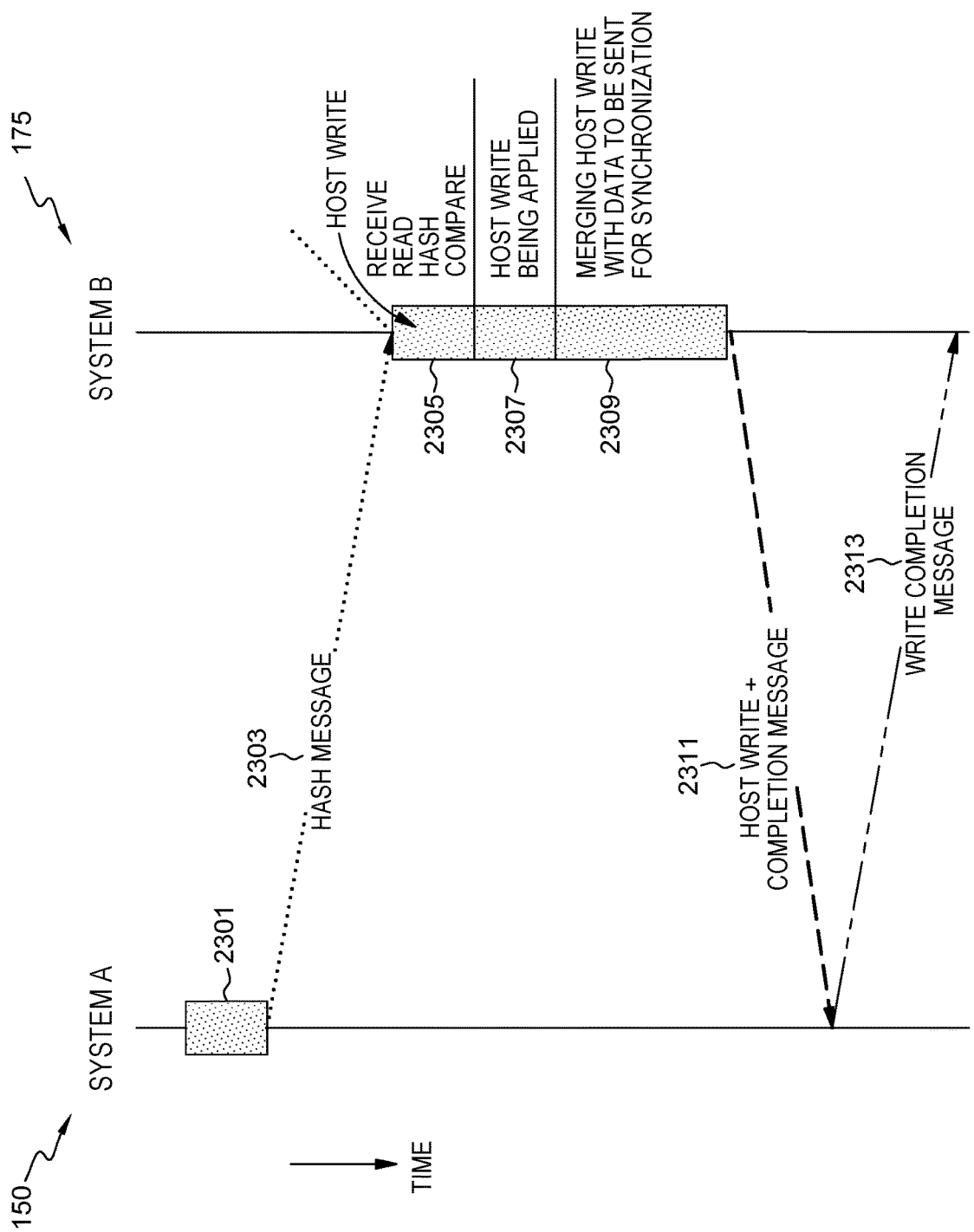
FIG. 23 depicts a message flow diagram illustrating a second option for the handling of a collision when system B receives a host write while processing the chunk for synchronization, in accordance with an embodiment of the present invention.

FIG. 23 depicts a message flow diagram illustrating a second option for the handling of a collision when system B receives a host write while processing the chunk for synchronization, in accordance with an embodiment of the present invention.

An interesting alternative to option 1 of scenario 4 consists in delaying the host write on System B to merge the messages and to avoid processing the chunk again, thus saving resources, bandwidth, and time.

In FIG. 23, System A begins processing a chunk at 2301 and transmits hash message 2303 to System B. After receiving the host write while processing the chunk at 2305, System B delays until the hash comparison is made. System B then applies the write at 2307 and merges the host write with data to be sent for synchronization at 2309. If the hashes are the same, System B will embed a "same data" message into host write and completion message 2311 so that when System A receives it, it knows that both copies are the same and that it has to apply the host write (and then it sends host write completion 2313 to System B). Alternatively, if the hashes are different, System B will send the whole new chunk (after the write has been applied) and host write and completion message 2311 indicate to System A that data were different and that there is a host write embedded in the message. Thus, when System A receives the message, it knows data is different and that by writing its copy with the data it received, both copies will end up the same and the host write will have been applied on both copies (and then System A sends host write completion 2313 to System B).

Figure 24:
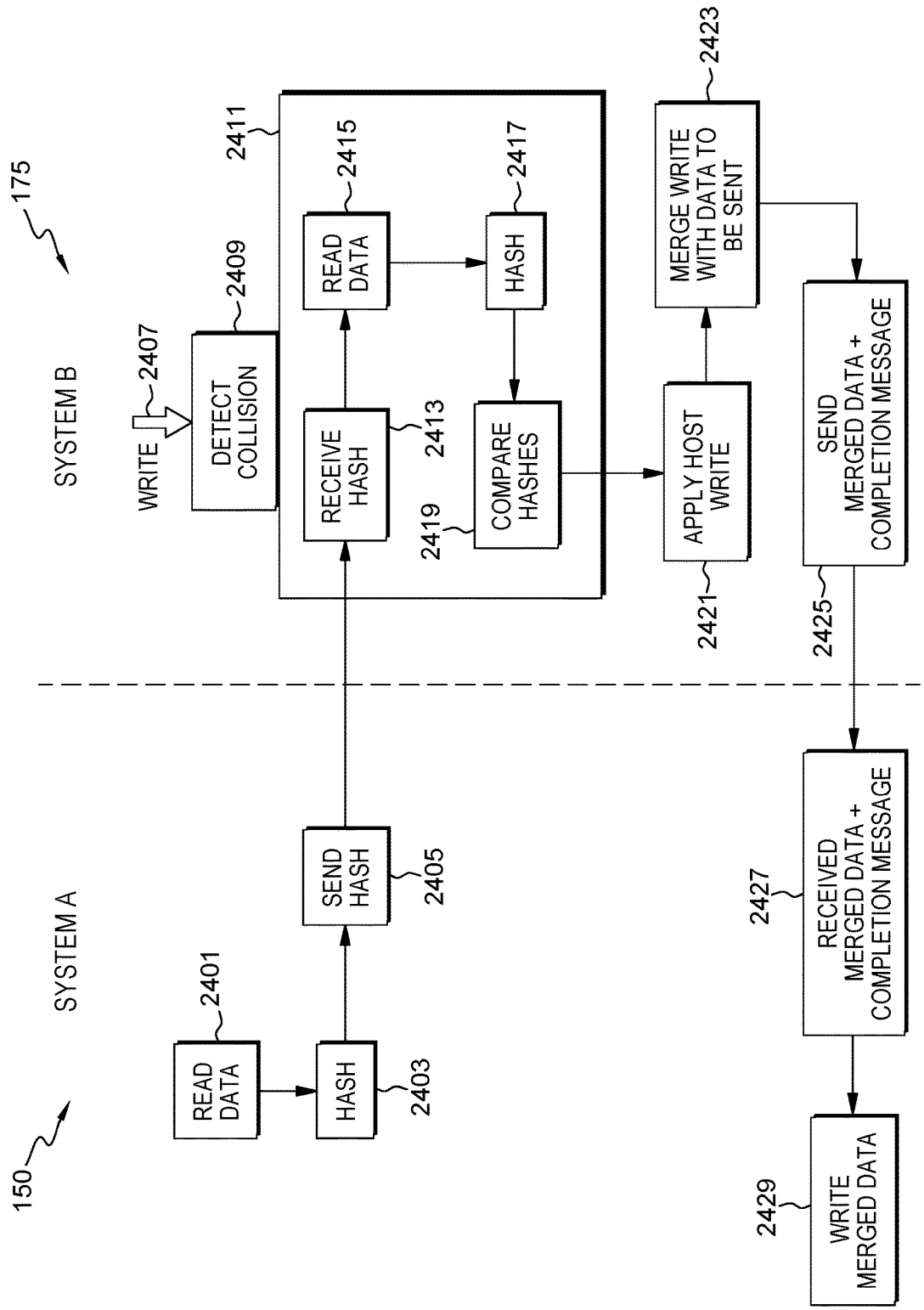
FIG. 24 depicts a flowchart illustrating the second option for the handling of a collision when system B receives a host write while processing the chunk for synchronization, in accordance with an embodiment of the present invention.

FIG. 24 depicts a flowchart illustrating the second option for the handling of a collision when system B receives a host write while processing the chunk for synchronization, in accordance with an embodiment of the present invention.

System B receives host write 2407 and detects a collision at 2409 while System B is processing the chunk at any step encompassed by block 2411. After detecting the collision, System B will delay the host write until the comparison, i.e. compare hashes at 2419, is complete. System B then applies the host write at 2421 and merges the data with the data it sends to System A for synchronization at 2423. When System A receives the message at 2427, System A writes its own copy to make both copies identical again at 2429.

Scenario 4: Option 3

Figure 25:
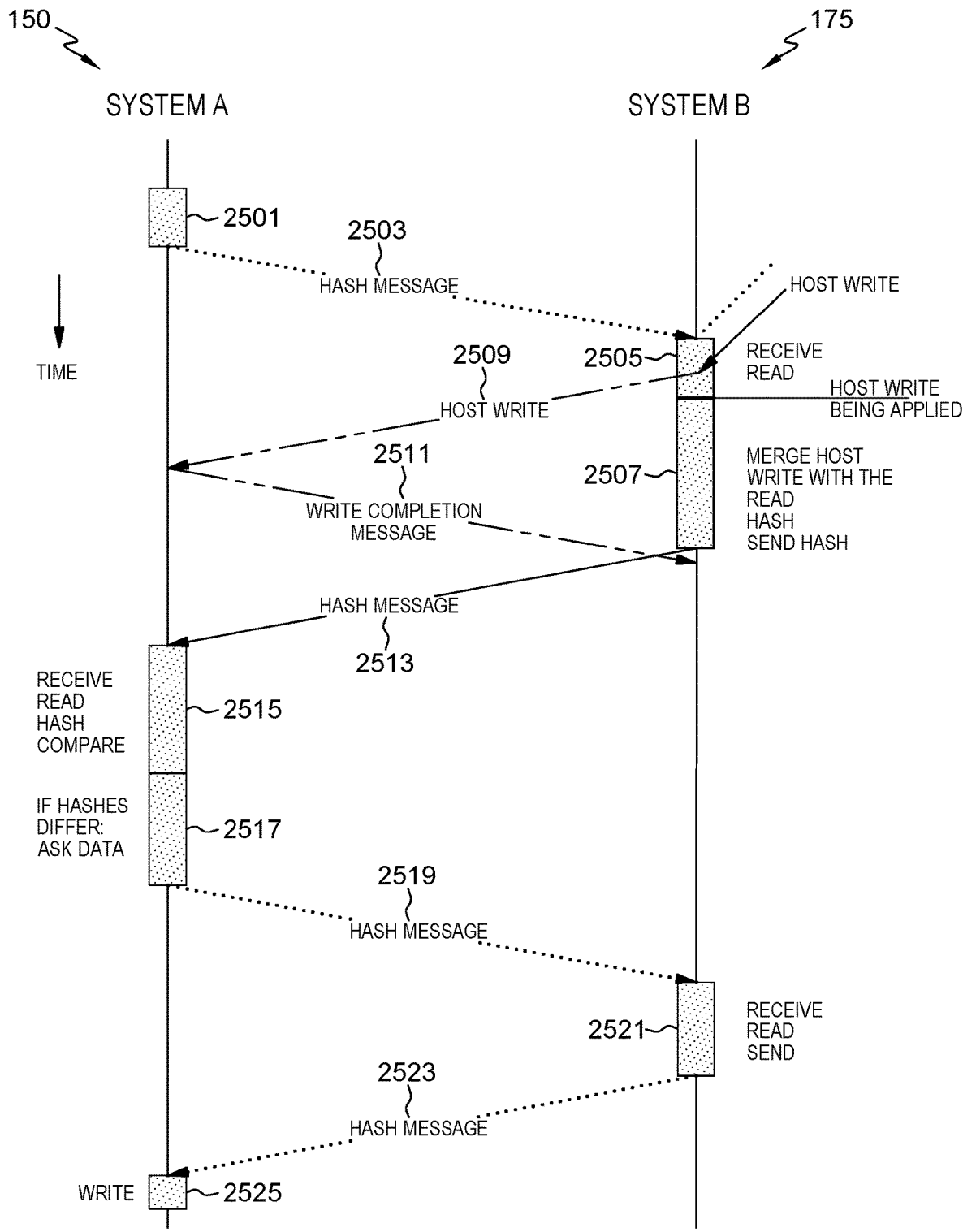
FIG. 25 depicts a message flow diagram illustrating a third option for the handling of a collision when system B receives a host write while processing the chunk for synchronization, in accordance with an embodiment of the present invention.

FIG. 25 depicts a message flow diagram illustrating a third option for the handling of a collision when system B receives a host write while processing the chunk for synchronization, in accordance with an embodiment of the present invention.

Another alternative to solve the collision of scenario 4 consists in letting System B reinitiate the synchronization process for this chunk. In this design, when System B receives the write at 2505, it will do the same as what is described for System A in collision scenario 1, option 2: System B will perform the write and will merge the host write into the read before hashing the data at 2507. At this point, the hashes should differ (except if the write contains the same data as what was present before and if both copies were identical), so comparing the hashes is wasteful. Thus, instead of sending the result of the comparison and possibly the data to System A, System B will send System A hash message 2513 of the chunk. Then when System A receives hash message 2513 for this chunk, it will read it, hash it, and compare the hashes at 2515. The behaviour of System A will now be dictated by the result of the hash comparison: (1) if hashes are the same, both copies are identical, nothing has to be done, and System A can complete the processing of the chunk; or (2) if hashes differ, System A needs the data from System B, so it sends hash message 2519 to System B asking for it to send the data, and when System B receives the message at 2521, it will send the data to System A in hash message 2523, thereby completing the synchronization process for this chunk.

Figure 26:
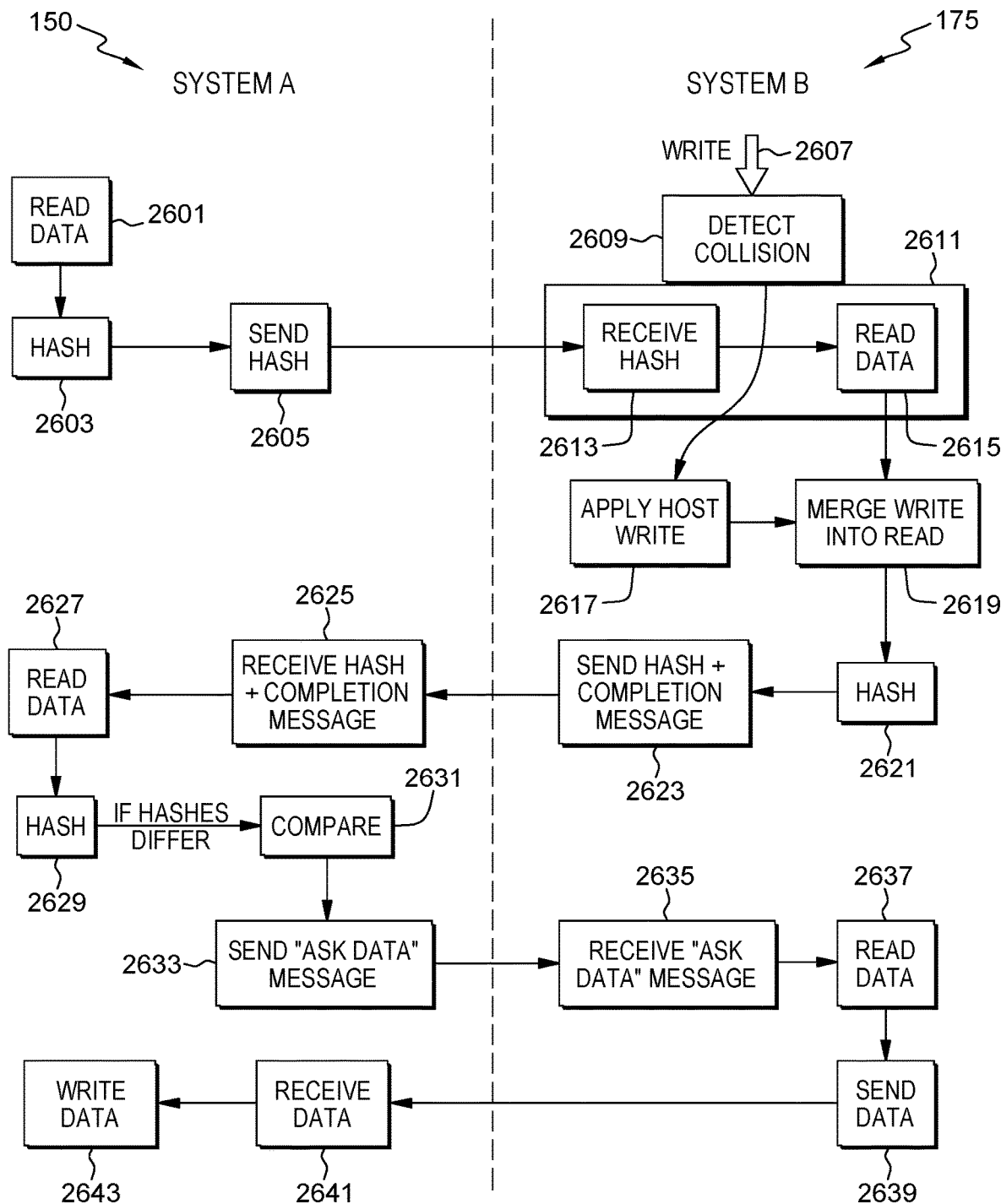
FIG. 26 depicts a flowchart illustrating the third option for the handling of a collision when system B receives a host write while processing the chunk for synchronization, in accordance with an embodiment of the present invention.

FIG. 26 depicts a flowchart illustrating the third option for the handling of a collision when system B receives a host write while processing the chunk for synchronization, in accordance with an embodiment of the present invention.

System B receives host write 2607 while performing any step encompassed by block 2611 and detects a collision at 2609. After detecting the collision, System B applies the host write at 2617 and merges the host write into the read at 2619, before hashing it at 2621 and sending the hash to System A at 2623. The host write is processed normally. When System A receives the hash at 2625, it reads its own copy at 2627, hashes it at 2629, and compare the hashes at 2631. If the hashes are the same, the process is complete (not shown). If hashes differ, System A sends a "ask data" message to System B at 2633. When System B receives the "ask data" message at 2635, it reads its own copy at 2637 and sends the data to System A at 2639. Then, when System A receives the data at 2641, it can write them to synchronize its copy with that of System B at 2643.

Scenario 5: Collision with Host Write

In addition to the above four collision scenarios, there is an additional scenario for synchronization: in the case of both copies having different data. System A receives a host write while writing System B's data to synchronize both copies. As described below, the write can be submitted directly to System A while it is writing (illustrated by FIG. 27, 28), or it can be submitted to System B and passed to System A while System A is writing (illustrated by FIG. 29).

Figure 27:
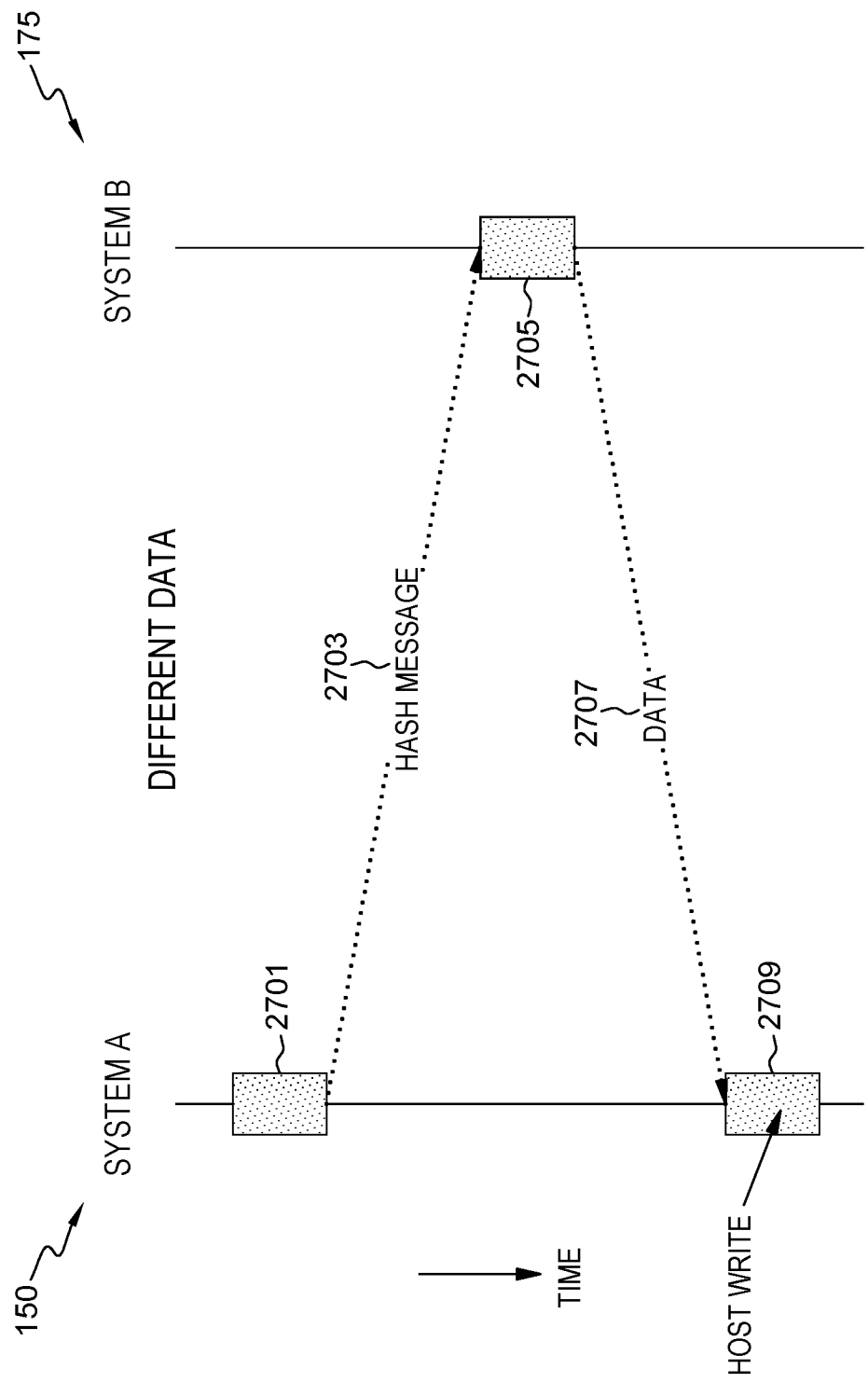
FIG. 27 depicts a message flow diagram illustrating a collision in which system A receives a host write while writing the data for synchronization, in accordance with an embodiment of the present invention.

FIG. 27 depicts a message flow diagram illustrating a collision in which system A receives a host write while writing the data for synchronization, in accordance with an embodiment of the present invention.

In FIG. 27, the host write is submitted on System A while writing its own copy for synchronization at 2709.

Figure 28:
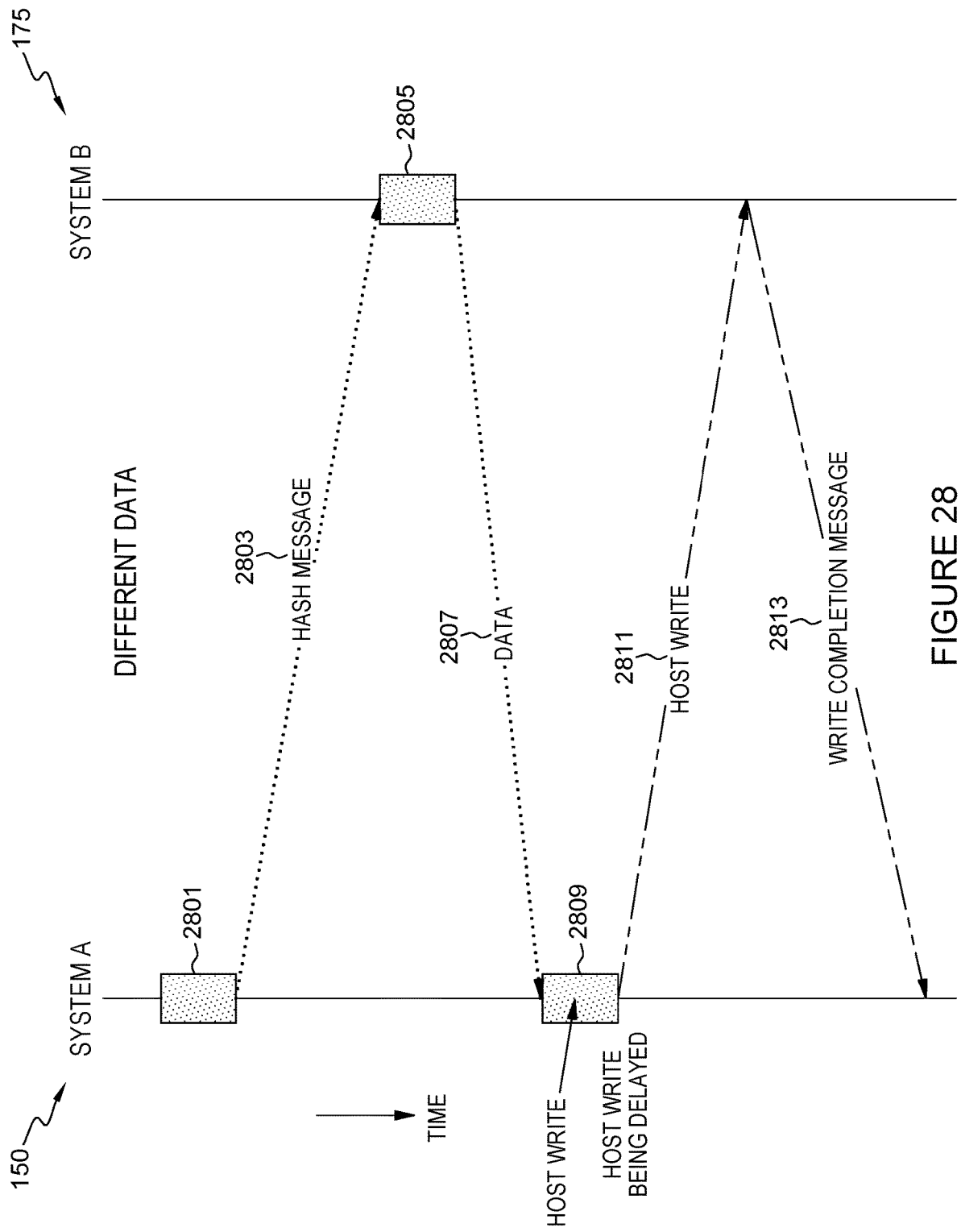
FIG. 28 depicts a message flow diagram illustrating a first option for the handling of a collision when system A receives a host write while writing data for synchronization, in accordance with an embodiment of the present invention.

FIG. 28 depicts a message flow diagram illustrating a first option for the handling of a collision when system A receives a host write while writing data for synchronization, in accordance with an embodiment of the present invention.

For this collision, the system could, as before, cancel the processing of the chunk on System A and make System A start it again after it has applied the host write. To optimize such a solution, System A could detect whether the write overwrites the entire chunk, in which case the synchronization is useless given the active-active technology. However, this solution is not efficient both in terms of resources and in terms of bandwidth as it means that the synchronization must be performed again, while all the data is at System A.

Instead of this solution, we propose to delay the write on System A at 2809 such that System A synchronizes its copy first before applying the write. Thus, there is no need to process the chunk again for synchronization and resources and bandwidth will be saved.

Figure 29:
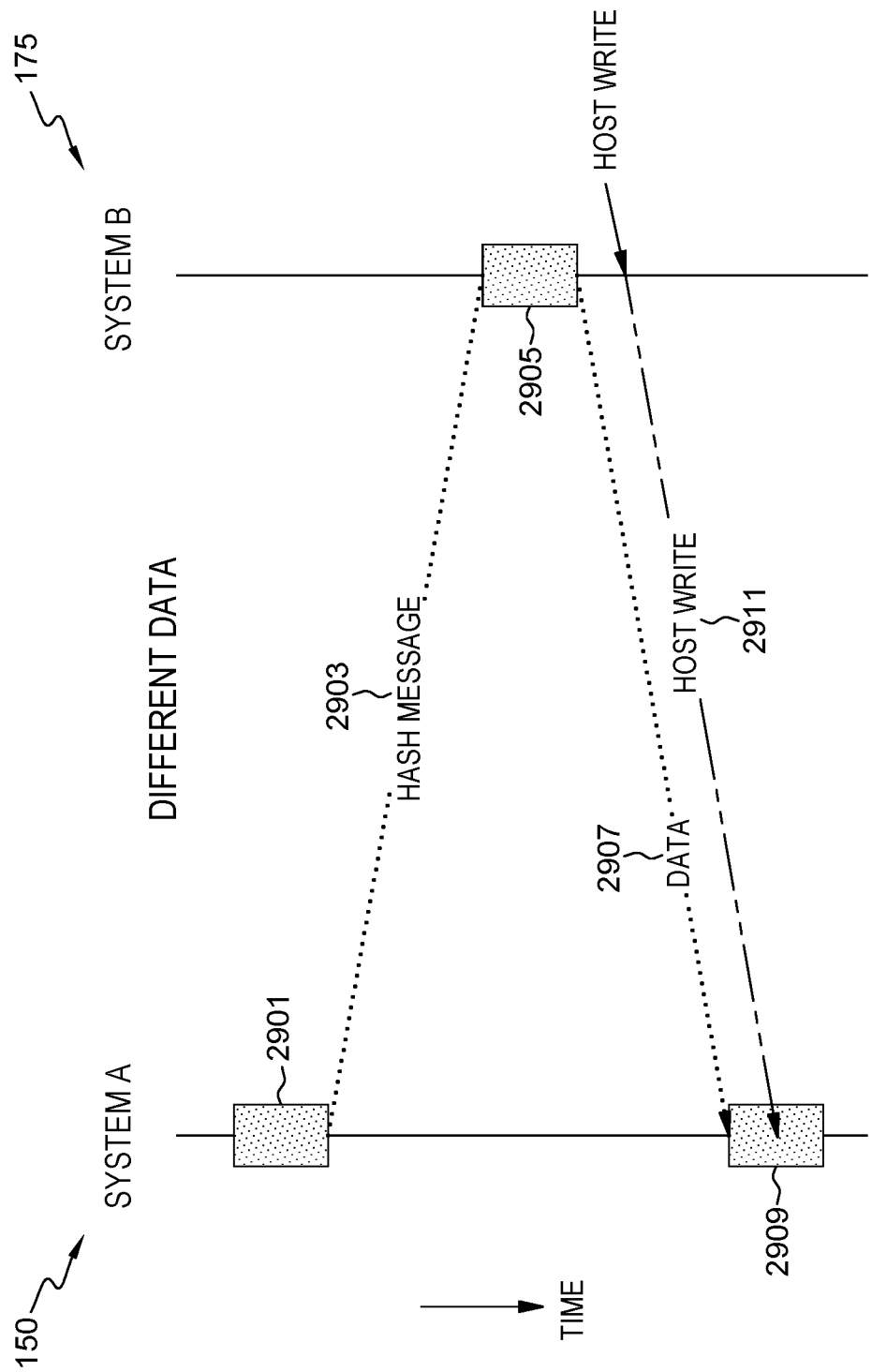
FIG. 29 depicts a message flow diagram illustrating a collision in which system B receives and transmits a host write to system A while system A is writing the data for synchronization, in accordance with an embodiment of the present invention.

FIG. 29 depicts a message flow diagram illustrating a collision in which system B receives and transmits a host write to system A while system A is writing the data for synchronization, in accordance with an embodiment of the present invention.

The host write is submitted on System B and System A receives the write while writing its own copy for synchronization at 2909.

Here, as the system to which the write is submitted does not matter to solve the collision, the following Figures will illustrate the case in which the host write is submitted directly to System A, i.e. operation illustrated FIG. 27.

Figure 30:
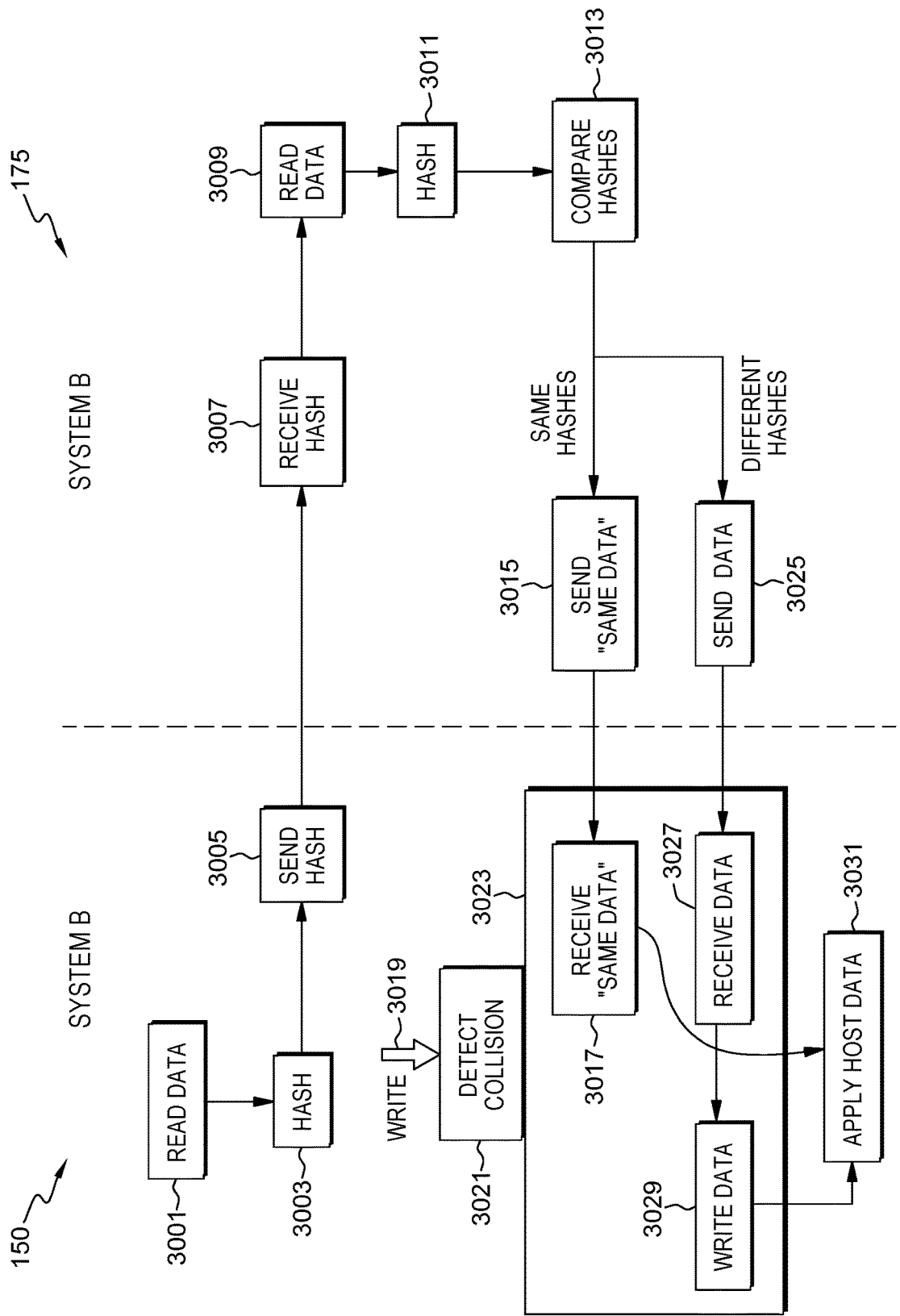
FIG. 30 depicts a flowchart illustrating the first option for the handling of a collision when system A receives a host write while writing data for synchronization, in accordance with an embodiment of the present invention.

FIG. 30 depicts a flowchart illustrating the first option for the handling of a collision when system A receives a host write while writing data for synchronization, in accordance with an embodiment of the present invention.

System A receives host write 3019 while performing any operation encompassed by block 3023 and detects a collision at 3021. After System A detects the collision, it will delay the host write until it has synchronized its own copy. Then it applies the host write at 3031 and sends a completion message to System B (not shown).

Keeping Track of Progress and Detecting Collisions

To keep track of the progress and decide which chunk to compare next, System A will also store a high-water mark. This high-water mark points to index of the chunk to process. It is initialized to 0 when the synchronization process is started and it is incremented every time System A decides to process another chunk.

This invention requires that System A and System B can easily detect collisions between host writes and the synchronization process.

Decreased Bandwidth Requirements

A benefit of this invention is that it does not send whole data blocks but only their hashes.

The preferred implementation uses the SHA-1 algorithm to compute 20B hashes from data chunks of 8 kB, making a transmitted data ratio of approximately 400:1. With this ratio, it means that to compare a volume of 1 TB, only 2.5 GB of hashes will be sent. This bandwidth reduction presents several advantages: (1) using less bandwidth means comparing hashes will be cheaper than comparing data; (2) more bandwidth is available for host I/Os, or for any other resources; and (3) as computing hashes is typically fast compared to sending data, sending less data means the comparison will be completed sooner.

Choosing the Hashing Algorithm

This invention is based on the computation of hashes of the data chunks. The choice of the hashing algorithm is not crucial for this invention in terms of security. In this invention, they are used here as a fingerprint of the data, to send smaller amounts of data compared to the actual size of the data. Thus, as long as the hashing algorithm does not create a high collision rate, any hashing algorithm is fine for this purpose. This means that the choice of the hashing algorithm can be only directed by the size of the data chunks that is decided and by the compression ratio to achieve.

It's important that the hashing algorithm chosen provides strong collision resistance, such that the possibility of two chunks with different data having matching hashes is acceptably remote. SHA-1 offers good collision resistance, such that data corruption is overwhelmingly likely to be detected.

Depending on the environment this invention is being used, it may be important to use a hashing algorithm that is preimage attack resistant to prevent a malicious user writing data to one copy that gives the same hash as data currently on the other copy, defeating the ability of this invention to detect differences. In such an environment, SHA-1 could be insufficient, and SHA-256 or other hashes may be preferred.

The avalanche effect of using a cryptographic hashing algorithm such as SHA-1 means that certain kinds of transmission errors (e.g. byte 340 of a message always having bit 4 set due to a failure in a memory module) are much easier to detect than by sending the raw data. Hashing algorithms with an avalanche effect should be chosen (in practice, all real-world cryptographic hashes offer this).

A final aspect in choosing a hashing algorithm is whether the hashing algorithm is sufficiently fast using the hardware available. For example, SHA-256 is significantly slower than SHA-1, making it inappropriate if the desired rate of data comparison exceeds the rate at which hashes can be generated. More computationally complex hashing algorithms may become feasible if hardware acceleration is used.

SUMMARY OF THE INVENTION

This invention proposes a novel way to synchronize two volumes in an active-active relationship. In particular, this active-active relationship enables replicating writes to both copies while enabling local pass-through reads. With this type of technology, it is of utmost importance to ensure that both copies are kept identical all the time. This solution proposes a novel system to synchronize both copies in such a relationship without quiescing host I/Os or even impacting them. Moreover, this invention makes use of hashes to compare data instead of comparing data directly to reduce the amount of bandwidth used, to reduce the amount of memory required and to speed up the process. This invention is based on previously disclosed comparison processes, and builds on it to propose a solution to the synchronization problem.

This invention also provides a solution to the different collisions between host writes and chunks being synchronized assuming an ordering of the messages sent by the two systems.

The following is a set of extensions to this invention. The invention may be considered by itself or with any combination of this extensions. Please also note that all the extensions presented in previous disclosures can be applied to this invention and thus those are not detailed here with the exception of Recording Differences—Capturing Data.

Recording Differences—Capturing Data

A useful feature this invention can propose is to record the differences and to capture the data when there is a difference between both copies. Recording differences can be easily done by using a bitmap and a counter. Every time a chunk has been compared, the bit of the data chunk is updated with the result of the comparison: (1) 0 if both copies have an identical chunk; or (2) 1 otherwise.

The role of the counter is to keep track of the number of chunks that have been processed. It is updated every time a bit in the bitmap is updated. The comparison process will be over when this counter reaches the number of chunks for the volume.

Furthermore, with the aforementioned bitmap, this invention also enables to capture data when they are different. Indeed, when System B detects a difference, it can store its own copy of the data chunk and when System A updates the bitmap with the corresponding 1, it can also store its own copy of the data chunk. This mechanism creates a database of the chunks with differences that can be investigated to understand the cause of the differences.

Giving Higher Priority to Most Active Regions for Synchronization

Combining this invention with functions that respond to the presence of drives in a storage pool that also contains HDDs is an interesting possibility and will provide interesting practical results. Indeed, such technologies enable knowing which parts of a volume are the most used and which are the least used. Typically, these technologies use a flag for each chunk to specify the nature of its tier: to be stored on fast, standard or slow storage, and possibly many other categories (e.g., most secure, etc.).

The invention detailed here can make use of this information easily to synchronize particular regions of a volume first. By using a bitmap in addition to the high-water mark to keep track of the progress, this invention would check its flag to decide to process a chunk. For example, if there were three categories of chunks (assume stored on most active, moderately active, and least active) and the user decide to synchronize them in the following order: most, moderately, and least active. The synchronization tool would first loop over all the chunks and only consider the most active ones. Then, when the tool is done with the most active ones, the high-water mark would be reset to zero and the synchronization would start again, considering only the moderately active chunks. And when the moderately active chunks have all been synchronized, the process would start again for the least active chunks. An active-active system that allows reads from the synchronised chunks of a partially-synchronized copy could see significantly decreased bandwidth requirements during synchronization with this optimization.

Using any Kind of Reads to Speed Up the Synchronization Process

As any solution about synchronization of two volume copies, this invention requires reading these copies before deciding if they are identical or not. Thus, in addition to host reads, each system has to perform reads of its own copy for the sake of the synchronization. These reads require resources and thus reduces the available resources for host I/Os. In this invention, we propose a way to make use of any kind of reads that occur in a storage system: host reads will be used to speed up synchronization, as well as in caching system, when sequential reads are performed in advance, while those and reads of the back-end storage for any other reason (e.g., RAID, when the parity has to be updated) will be used for synchronization, as well. Thus, the order that the synchronization process synchronizes chunks within the volume will be driven entirely or in part by the pattern of reads to the volume.

Using Host Reads

Host reads provide a good source of reads that do not require any extra resources. Indeed, those can be used after the read has been completed to the host so that we do not affect host I/O latency. For a chunk that is to be synchronized, instead of releasing the resources of the read, it will be synchronized earlier than expected by the normal process, after having hashed its data. When a chunk is processed before the high-water mark reaches it, we would set up the flag indicating the chunks are synchronized (in the same way writes do). By doing so, we will save the read for the chunks that are being read for host I/Os.

Sequential Reads in Caching Systems

In caching systems, when a host performs a read, the system may end up reading more data than the read in case the host performs a series of sequential reads, a process known as "read-ahead". This feature enables speeding up the read process of future reads and thus decreases their latency drastically. The synchronization process could also take advantage of this feature to process chunks more quickly, again by using the resources that the host reads will use.

Using Other System Reads

Finally, a system generates reads of data for many reasons. For example: (1) writing a chunk in a RAID 5 or 6 configuration: to update the parity, the system will need to read all the extents; (2) data scrubbing: when performing data scrubbing, entire arrays are read to check the sanity of the data, and those reads can also be used to speed-up the synchronization process; (3) reads for mirrored volumes: reads are performed when mirroring a volume to another; (4) grain point-in-time copy: grain point-in-time copy requires reading a source to copy data to a target; (5) compressed volume: the compression grains may be of different size (generally bigger) than 8 kB, so this means that a host read of 8 kB can end up in read a much bigger grain to decompress it, and instead of just wasting these resources, this invention can make use of them; and (6) synchronization of deduplicated matching regions: in a system with a deduplication technology, when we are trying to synchronize a grain that has been deduplicated, we can make use of this information to speed-up the synchronization process by synchronizing at the same time for no additional cost for the deduplicated matching grains. Any of these reads can be used to speed up the synchronization process.

Which System should Use these Optimizations

Theoretically, both systems can use these optimizations to improve the invention and speed up the synchronization process. However, in practice, one system has a heavier workload than the other—let's call this system "the HW system" and the other "the LW system"—and this can lead to unbalancing the workload on the two systems.

Having all these optimizations running on the LW systems means that the HW system in addition to its traditional workload will have to cope with an extra workload coming from the synchronization driven by the LW system. This will result in additional workload on the HW system, meaning that its overall performances may decrease, with no benefit to be gained on the LW system. Moreover, the LW system, having a lighter workload, will have fewer reads than the HW system, making these optimizations less frequent.

Thus, it would make much more sense to only use these optimizations on the HW systems, where most of the reads (host reads+any additional reads) will occur and where their impact on the synchronization process will be the greater. Simultaneously performing these optimisations on the LW system would require additional coordination, as both systems would be attempting to drive the synchronization process. Also, the system using these optimizations can be dynamically chosen according the workload in an I/O group, on a volume, or on an extent to try to balance as much as we can the workload.

Space-Efficient Volumes and Synchronization

Space efficient volumes contain metadata describing which grains are allocated. Using this information on both copies before starting the synchronization process to build a bitmap of the allocated grains can help speed up the synchronization process. Indeed, by comparing the bitmaps we can decide to skip entire grains. For a given grain: (1) if both bitmaps say that is in an unallocated grain, then there is no need to synchronize this grain; (2) if one bitmap says this grain is in an allocated grain, but the other does not, then we need only copy data without hashing it; and (3) if both bitmaps say this grain is in an allocated grain, then a standard synchronization of this grain is needed.

Based on the foregoing, a computer system, method, and computer program product have been disclosed. However, numerous modifications and substitutions can be made without deviating from the scope of the present invention. Therefore, the present invention has been disclosed by way of example and not limitation.

Figure 31:
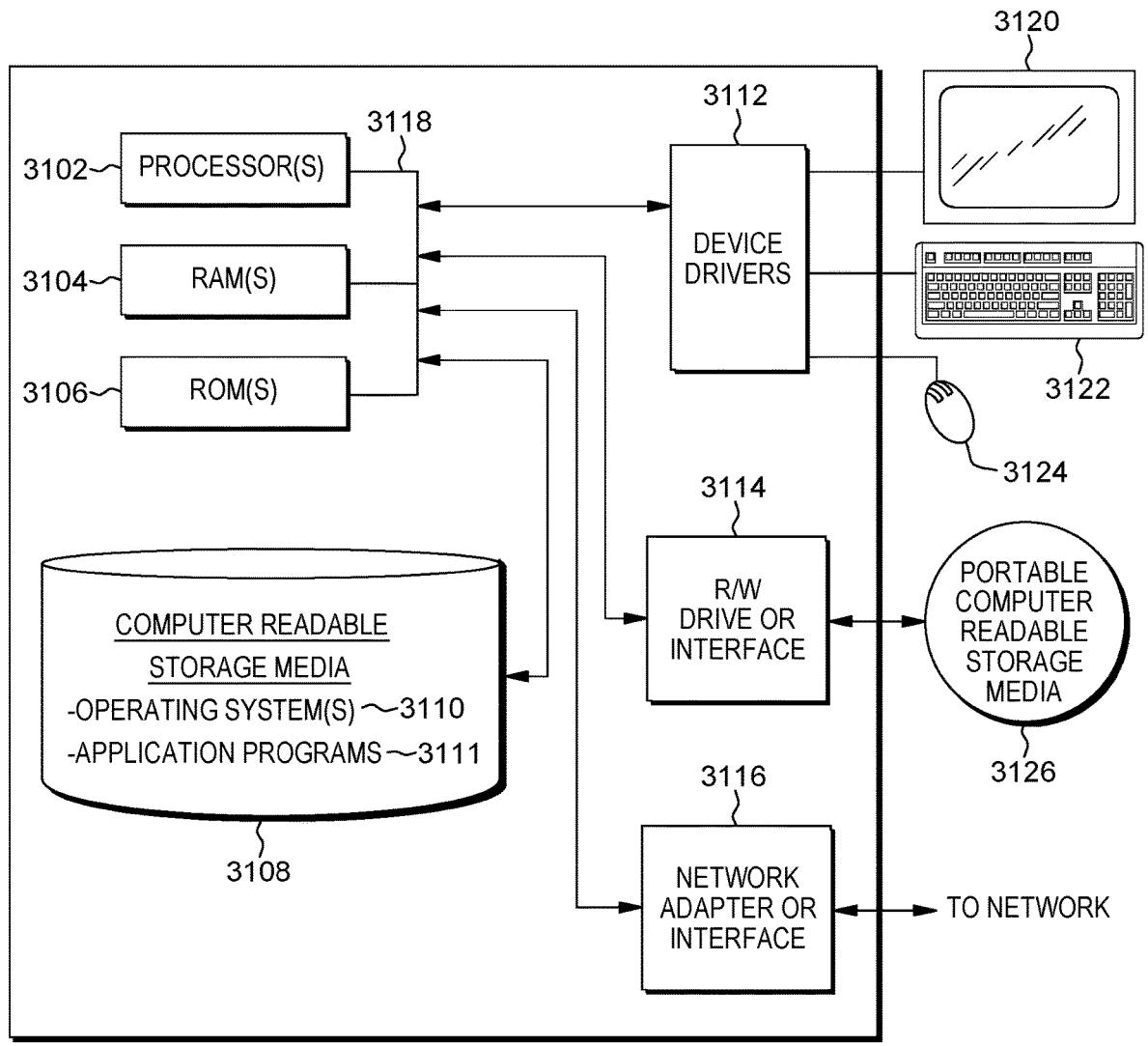
FIG. 31 depicts a block diagram depicting the hardware components of data synchronization system 100 of FIG. 1, in accordance with an embodiment of the present invention.

FIG. 31 depicts a block diagram depicting the hardware components of data synchronization system 100 of FIG. 1, in accordance with an embodiment of the present invention.

It should be appreciated that FIG. 31 provides only an illustration of one implementation and does not imply any limitations with regard to the environments in which different embodiments may be implemented. Many modifications to the depicted environment may be made.

Storage system 110/120 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Storage system 110/120 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Storage system 110/120 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Storage system 110/120 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 32:
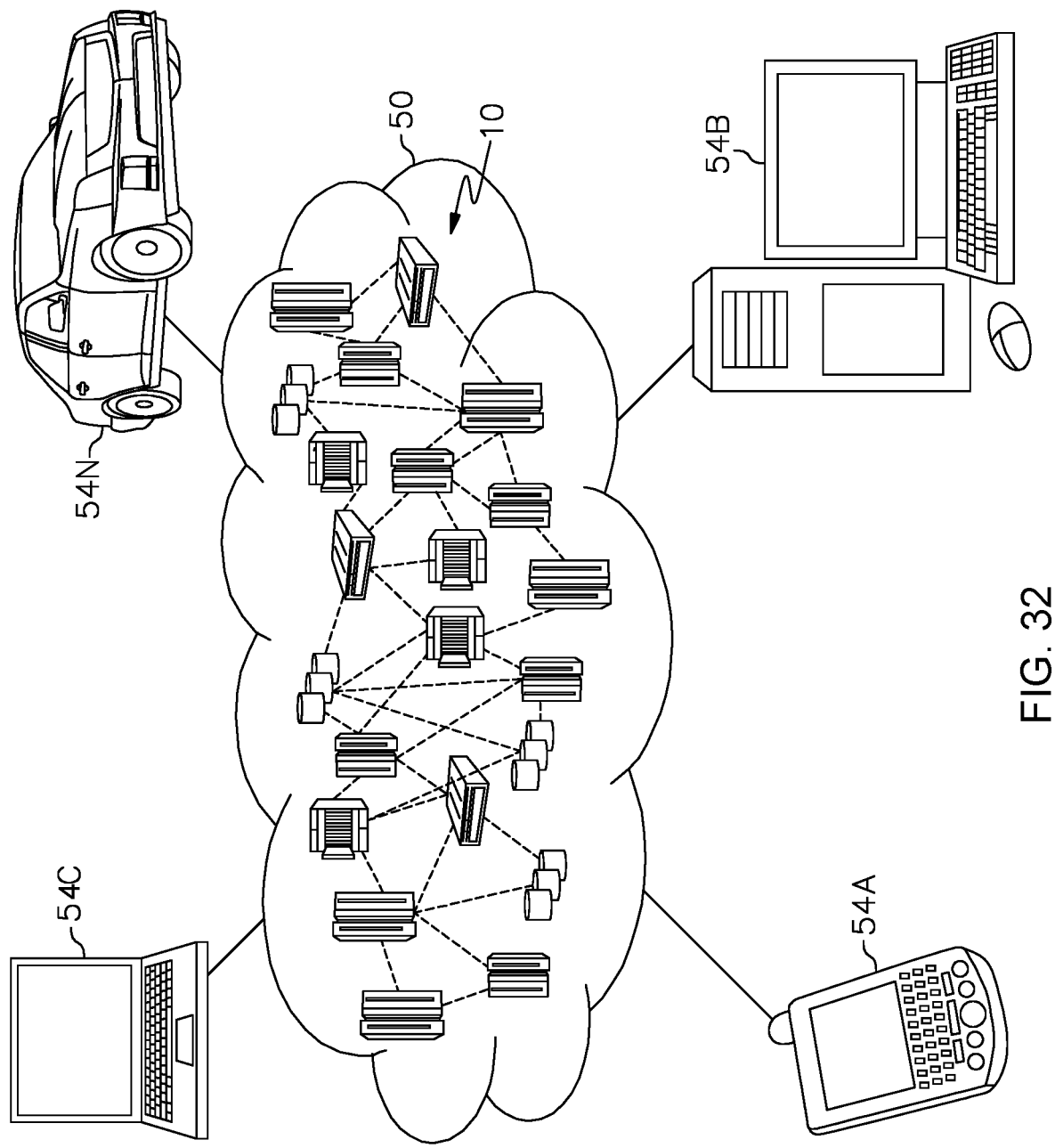
FIG. 32 depicts a cloud computing environment, in accordance with an embodiment of the present invention.
Figure 33:
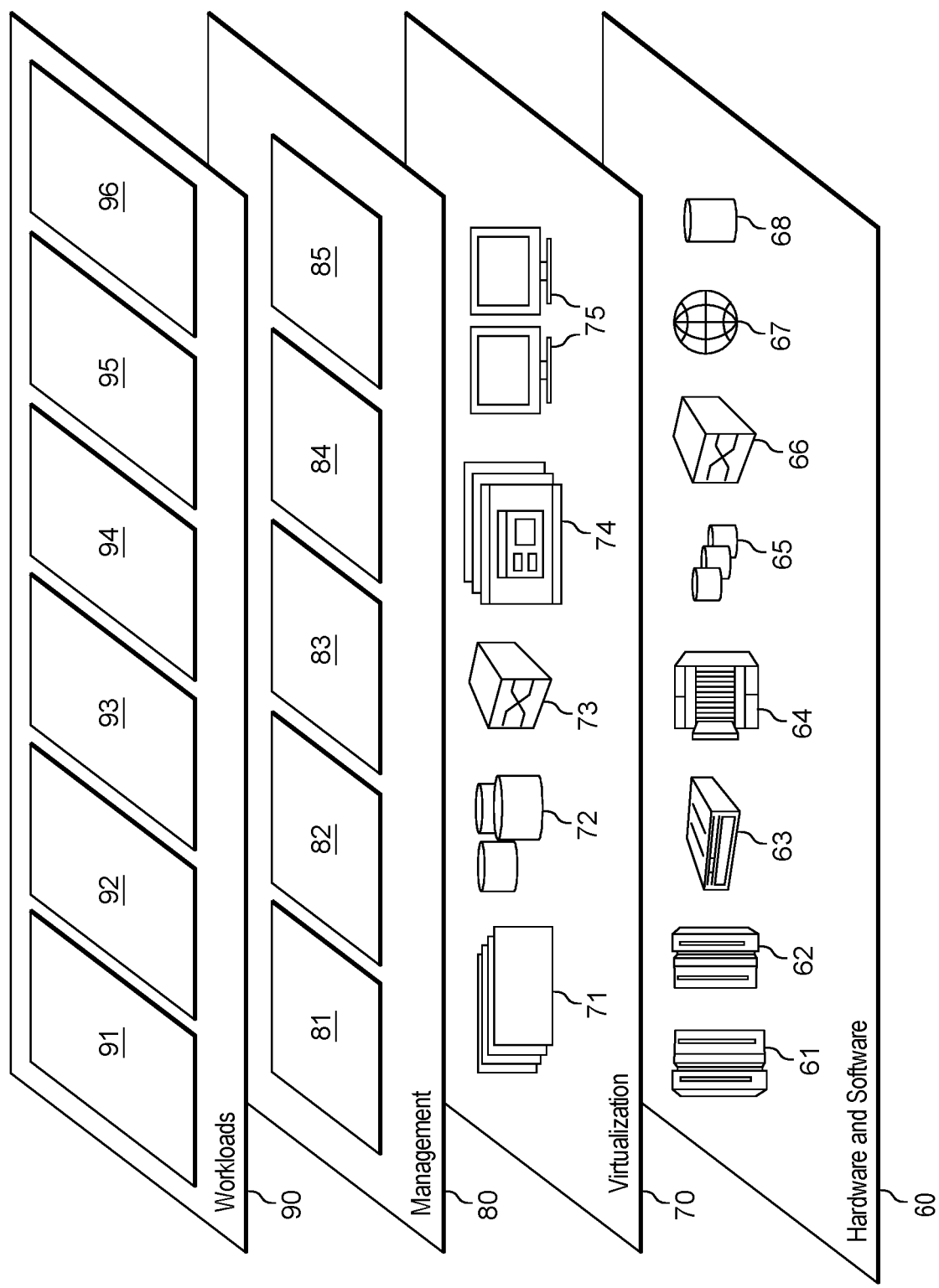
FIG. 33 depicts abstraction model layers, in accordance with an embodiment of the present invention.

Referring now to FIG. 32, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for data synchronization in a distributed database system, the distributed database system comprising a first data storage device having a first set of data regions and a second data storage device having a second set of data regions corresponding to the first set of data regions, the method comprising:
   processing, by the first data storage device, a first data region of the first set of data regions by:
      reading, by the first data storage device, the first data region;
      generating, by the first data storage device, a first hash of the first data region;
   receiving, by the first data storage device, a host write during the processing of the first data region;
   delaying, by the first data storage device, the processing of the first data region;
   applying, by the first data storage device, the host write;
   receiving, by the first data storage device from the second data storage device, a message indicating that the second data storage device has applied the host write;
   restarting, by the first data storage device, the processing of the first data region;
   transmitting, by the first data storage device, the first hash to the second data storage device;
   receiving, by the second data storage device, the first hash;
   processing, by the second data storage device, a second data region of the second set of data regions corresponding to the first data region by:
      reading, by the second data storage device, the second data region;
      generating, by the second data storage device, a second hash of the second data region;
   determining, by the second data storage device, whether the first hash matches the second hash;
   based on determining that the first hash does not match the second hash, the second data storage device transmitting data of the second data region to the first data storage device; and
   applying, by the first data storage device, the data of the second data region, thereby synchronizing the first data storage device and the second data storage device.

2. The method of claim 1, further comprising:
based on determining that the first hash matches the second hash, the second data storage device transmitting a message to the first data storage device indicating that the first data region and the second data region contain a same data.

3. The method of claim 1, further comprising:
receiving, by the second data storage device, a host write prior to receiving the first hash;
transmitting, by the second data storage device to the first data storage device, the host write;
receiving, by the second data storage device from the first data storage device, the first hash;
applying, by the first data storage device, the host write;
receiving, by the second data storage device from the first data storage device, a message indicating that the first data storage device has applied the host write;
discarding, by the second data storage device, the processing of the second data region; and
transmitting, by the second data storage device to the first data storage device, a message to restart the processing of the first data region.

4. The method of claim 1, further comprising:
receiving, by the second data storage device, a host write prior to receiving the first hash;
transmitting, by the second data storage device to the first data storage device, the host write;
receiving, by the second data storage device from the first data storage device, the first hash;
applying, by the first data storage device, the host write;
receiving, by the second data storage device from the first data storage device, a message indicating that the first data storage device has applied the host write; and
transmitting, by the second data storage device to the first data storage device, a message to restart the processing of the first data region for data of the first data region that does not overlap with data of the host write.

5. The method of claim 1, further comprising:
receiving, by the second data storage device, a host write prior to receiving the first hash;
transmitting, by the second data storage device to the first data storage device, the host write;
receiving, by the second data storage device from the first data storage device, the first hash;
delaying, by the second data storage device, the processing of the second data region;
applying, by the first data storage device, the host write;
receiving, by the second data storage device from the first data storage device, a message indicating that the first data storage device has applied the host write;
processing, by the second data storage device, the second data region; and
transmitting, by the second data storage device to the first data storage device, data of the second data region that does not overlap with data of the host write.

6. The method of claim 1, further comprising:
receiving, by the second data storage device, a host write prior to receiving the first hash;
transmitting, by the second data storage device to the first data storage device, the host write;

receiving, by the second data storage device from the first data storage device, the first hash;
applying, by the first data storage device, the host write;
receiving, by the second data storage device from the first data storage device, a message indicating that the first data storage device has applied the host write;
processing, by the second data storage device, the second data region; and
transmitting, by the second data storage device to the first data storage device, the second hash.

7. The method of claim 1, further comprising:
receiving, by the second data storage device, a host write during the processing of the of the second data region;
discarding, by the second data storage device, the processing of the second data region;
applying, by the second data storage device, the host write; and
transmitting, by the second data storage device to the first data storage device, the host write and a message to restart the processing of the first data region.

8. The method of claim 1, further comprising:
receiving, by the second data storage device, a host write during the processing of the second data region;
delaying, by the second data storage device, application of the host write;
processing, by the second data storage device, the second data region;
applying, by the second data storage device, the host write;
based on determining that the first hash matches the second hash, transmitting, by the second data storage device to the first data storage device, the host write and a message indicating that the first data region and the second data region contain a same data; and
based on determining that the first hash does not match the second hash, transmitting, by the second data storage device to the first data storage device, the host write and data of the second data region.

9. The method of claim 1, further comprising:
receiving, by the second data storage device, a host write during the processing of the of the second data region;
applying, by the second data storage device, the host write;
processing, by the second data storage device, the second data region including the host write; and
transmitting, by the second data storage device to the first data storage device, the second hash of the second data region that includes the host write.

10. The method of claim 1, further comprising:
receiving, by the first data storage device, a host write while applying the received data of the second data region;
delaying, by the first data storage device, application of the host write;
applying, by the first data storage device, the received data of the second data region to the first data storage device; and
applying, by the first data storage device, the host write.

11. The method of claim 1, wherein transmissions between the first data storage device and the second data storage device are in-order.

12. The method of claim 1, wherein the first hash and the second hash are generated using a SHA-1 algorithm.

13. The method of claim 1, wherein the first hash and the second hash are generated using a SHA-256 algorithm.

14. The method of claim 1, wherein the first data region and the second data region are hashed in 8 kB data chunks to generate the first hash and the second hash of 20 B size.

* * * * *